US010790698B2

(12) United States Patent
Umezawa

(10) Patent No.: US 10,790,698 B2
(45) Date of Patent: Sep. 29, 2020

(54) UNINTERRUPTIBLE POWER SUPPLY SYSTEM AND UNINTERRUPTIBLE POWER SUPPLY

(71) Applicant: FUJI ELECTRIC CO., LTD., Kawasaki-shi, Kanagawa (JP)

(72) Inventor: Kazuyoshi Umezawa, Kobe (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 75 days.

(21) Appl. No.: 16/260,728

(22) Filed: Jan. 29, 2019

(65) Prior Publication Data

US 2019/0157903 A1    May 23, 2019

Related U.S. Application Data

(63) Continuation of application No. PCT/JP2017/045958, filed on Dec. 21, 2017.

(30) Foreign Application Priority Data

Feb. 21, 2017    (JP) ................. 2017-029826

(51) Int. Cl.
*H02J 9/06*    (2006.01)
*H02M 7/493*    (2007.01)
*H02M 7/77*    (2006.01)
*H02J 3/46*    (2006.01)
*H02M 7/08*    (2006.01)

(52) U.S. Cl.
CPC ............... *H02J 9/062* (2013.01); *H02J 3/46* (2013.01); *H02M 7/08* (2013.01); *H02M 7/493* (2013.01); *H02M 7/77* (2013.01)

(58) Field of Classification Search
CPC ..... H02J 9/06; H02J 9/062; H02J 3/46; H02M 7/08; H02M 7/493; H02M 7/77
See application file for complete search history.

(56) References Cited

U.S. PATENT DOCUMENTS 9,093,861 B2    7/2015    Nakano et al.

FOREIGN PATENT DOCUMENTS

| JP | H04-355630 A | 12/1992 |
|---|---|---|
| JP | 2007-028837 A | 2/2007 |
| JP | WO2011/033820 A1 | 3/2011 |
| JP | 2013-031325 A | 2/2013 |
| JP | 2013-219958 A | 10/2013 |
| JP | 2014-005398 A | 1/2014 |
| WO | 2017/009998 A1 | 1/2017 |

OTHER PUBLICATIONS

International Search Report PCT/JP2017/045958; dated Mar. 20, 2018; PCT/ISA/210.
Written Opinion by the International Search Authority PCT/JP2017/045958; dated Mar. 6, 2018; PCT/ISA/237.

*Primary Examiner* — Robert L Deberadinis
(74) *Attorney, Agent, or Firm* — Manabu Kanesaka

(57) ABSTRACT

A plurality of uninterruptible power supplies of an uninterruptible power supply system controls start or stop of shared current supply from power converters to a load based on shared current commands, which indicate command values for determining a value of shared current to be supplied from the power converters of the plurality of uninterruptible power supplies to the load.

19 Claims, 15 Drawing Sheets

*FIG.6*

| PRIORITIES (NUMBERS IN PARENTHESES INDICATE PRIORITIES FOR EFFICIENT OPERATION) | BASE OPERATION | | EFFICIENT OPERATION | | | |
|---|---|---|---|---|---|---|
| | 1 | 2 | 3(1) | 4(2) | 5(3) | 6(4) |
| START PRIORITY OFFSET (SECONDS) | CONTINUOUS OPERATION | CONTINUOUS OPERATION | 10 | 20 | 30 | 40 |
| STOP PRIORITY OFFSET (SECONDS) | CONTINUOUS OPERATION | CONTINUOUS OPERATION | 400 | 300 | 200 | 100 |

| PRIORITIES (NUMBERS IN PARENTHESES INDICATE PRIORITIES FOR EFFICIENT OPERATION) | FAILURE | BASE OPERATION | | EFFICIENT OPERATION | | |
|---|---|---|---|---|---|---|
| | 1 | 2 | 3 | 4(1) | 5(2) | 6(3) |
| START PRIORITY OFFSET (SECONDS) | | CONTINUOUS OPERATION | CONTINUOUS OPERATION | 10 | 20 | 30 |
| STOP PRIORITY OFFSET (SECONDS) | | CONTINUOUS OPERATION | CONTINUOUS OPERATION | 400 | 300 | 200 |

UNINTERRUPTIBLE POWER SUPPLY SYSTEM AND UNINTERRUPTIBLE POWER SUPPLY

CROSS-REFERENCE TO RELATED APPLICATION

This application is a continuation of PCT application PCT/JP2017/045958, filed on Dec. 21, 2017, which is based upon and claims priority of Japanese patent application No. 2017-029826, filed on Feb. 21, 2017, the entire contents of which are incorporated herein by reference.

BACKGROUND OF THE INVENTION

Field of the Invention

The present invention relates to an uninterruptible power supply system and an uninterruptible power supply, and more particularly, it relates to an uninterruptible power supply system and an uninterruptible power supply, both of which include power converters that share current (hereinafter referred to as shared current) to be supplied to a load.

Description of the Background Art

An uninterruptible power supply system including power converters that supply shared current to a load is known in general. Such an uninterruptible power supply system is disclosed in Japanese Patent Laid-Open No. 2013-031325, for example.

An uninterruptible power supply system disclosed in Japanese Patent Laid-Open No. 2013-031325 includes a plurality of uninterruptible power supplies connected in parallel to each other to a load. Each of the plurality of uninterruptible power supplies includes a converter, an inverter, a current detector that detects the output current (shared current to be supplied to the load) of the inverter, and a controller that controls the converter and the inverter based on the detection result of the current detector. The controller of each of the plurality of uninterruptible power supplies transmits the detection result (current value) of its current detector to the controllers of the other uninterruptible power supplies, and receives the detection results (current values) of the current detectors of the other uninterruptible power supplies. Then, the controller sums the detection result (current value) of its current detector and the detection results (current values) of the current detectors provided in the other uninterruptible power supplies. Then, based on the summed current values (load current), the controller determines an appropriate number of uninterruptible power supplies required to supply the load current. Then, the controller determines whether or not the uninterruptible power supplies are placed in a standby state or in an operating state based on the determined appropriate number and the number of currently operating devices, and controls the converters and the inverters to stop when placing the uninterruptible power supplies in a standby state and controls the converters and the inverters to operate when placing the uninterruptible power supplies in an operating state.

In the uninterruptible power supply system disclosed in Japanese Patent Laid-Open No. 2013-031325, the controller receives (samples) the detection results of the current detectors provided in the other uninterruptible power supplies, sums the detection result (current value) of its current detector and the detection results (current values) of the current detectors provided in the other uninterruptible power supplies, and determines an appropriate number of necessary uninterruptible power supplies (shared current to be supplied by one uninterruptible power supply). Therefore, there is a disadvantage that a change in load current cannot be detected when the controller requires a long sampling time and the load current changes in a relatively short time. Thus, there is a problem that the timing of switching between the standby state (a state in which shared current supply to the load has been stopped) of the uninterruptible power supplies and the operating state (a state in which shared current is being supplied to the load) of the uninterruptible power supplies is delayed when the load current rapidly changes.

SUMMARY OF THE INVENTION

The present invention has been proposed in order to solve the aforementioned problem, and an object of the present invention is to provide an uninterruptible power supply system and an uninterruptible power supply capable of quickly switching between a state in which shared current supply to a load has been stopped and a state in which shared current is being supplied to the load.

In order to attain the aforementioned object, an uninterruptible power supply system according to a first aspect of the present invention includes a plurality of uninterruptible power supplies connected in parallel to each other to a load, and each of the plurality of uninterruptible power supplies includes a power converter that supplies current to the load, a current detector that detects the current that flows through wiring that connects the power converters of the plurality of uninterruptible power supplies in parallel to each other, a shared current command generator that generates a shared current command, which indicates a command value for determining a value of shared current to be supplied from the power converters of the plurality of uninterruptible power supplies to the load based on the current detected by the current detector, and a controller that controls start or stop of shared current supply from the power converter to the load based on the shared current command.

In the uninterruptible power supply system according to the first aspect of the present invention, as described above, the current detector detects the current that flows through the wiring that connects the power converters of the plurality of uninterruptible power supplies in parallel to each other. Accordingly, the average current (the average value of the current) obtained by dividing the current to be supplied to the load by the number of uninterruptible power supplies that supply the shared current flows through the wiring, and thus the average value of the current for determining the shared current can be detected without sampling a result (current value) detected by the current detector provided in another uninterruptible power supply. Thus, the shared current command generator can quickly generate the shared current command based on the average value of the current quickly detected by the current detector. Consequently, the controller can quickly control the start or stop of shared current supply from the power converter of its uninterruptible power supply to the load based on the quickly generated shared current command. Thus, the uninterruptible power supplies can quickly switch between a state in which shared current supply to the load has been stopped and a state in which shared current is being supplied to the load.

In the aforementioned uninterruptible power supply system according to the first aspect, the controller preferably performs control of comparing a shared current level according to a magnitude of the shared current command with a first start threshold common to the plurality of uninterruptible power supplies, integrating a time in which the shared current level becomes equal to or higher than the first start threshold, and starting the shared current supply from the power converter when an integrated value becomes equal to or higher than a second start threshold provided for each power converter to determine whether or not the shared current supply is started from the power converter. According to this structure, the controller starts the shared current supply from the power converter based on the shared current level according to the magnitude of the shared current command detected by its current detector without sampling a result (current value) detected by the current detector provided in another uninterruptible power supply and determining an appropriate number of necessary uninterruptible power supplies, and thus the shared current supply from the power converter can be quickly started. When the start of shared current supply from the power converter is delayed, current is excessively supplied from another uninterruptible power supply in order to compensate for the shortage of power to be supplied to the load. On the other hand, in the aforementioned uninterruptible power supply system according to the first aspect, the shared current supply from the power converter can be quickly started, and thus excessive current supply from another uninterruptible power supply can be significantly reduced or prevented.

In this case, the controller preferably performs control of comparing the shared current level according to the magnitude of the shared current command with the first start threshold common to the plurality of uninterruptible power supplies and subtracting a time in which the shared current level becomes lower than the first start threshold from the integrated value when the shared current level becomes lower than the first start threshold after the shared current level becomes equal to or higher than the first start threshold.

In the aforementioned uninterruptible power supply system in which the shared current supply is started when the integrated value becomes equal to or higher than the second start threshold, the second start threshold preferably decreases as the shared current level increases. According to this structure, when the load current (shared current level) sharply increases, the second start threshold sharply decreases, and thus the integrated value quickly becomes equal to or higher than the second start threshold. Thus, when the load current (shared current level) sharply increases, the shared current supply from the power converter can be started more quickly.

In the aforementioned uninterruptible power supply system in which the shared current supply is started when the integrated value becomes equal to or higher than the second start threshold, the first start threshold preferably increases as a number of power converters that supply shared current to the load increases. According to this structure, when the number of power converters that supply the shared current to the load increases, the shared current level is unlikely to become equal to or higher than the first start threshold. That is, when the number of power converters that supply the shared current to the load increases, a frequent increase in the number of power converters that supply the shared current to the load can be significantly reduced or prevented.

In the aforementioned uninterruptible power supply system in which the shared current supply is started when the integrated value becomes equal to or higher than the second start threshold, the plurality of uninterruptible power supplies preferably includes at least three uninterruptible power supplies, power converters provided in the at least three uninterruptible power supplies are preferably assigned to a first power converter that constantly supplies shared current to the load and a plurality of second power converters that starts or stops the shared current supply according to a magnitude of the shared current to the load, priorities are preferably set on a plurality of the power converters, and smaller second start thresholds are preferably assigned as set priorities are higher. According to this structure, as the set priorities are higher, the shared current supply is more quickly started, and thus a state in which current is excessively supplied from another uninterruptible power supply in order to compensate for the shortage of power to be supplied to the load can be further significantly reduced or prevented.

In this case, the controller provided in each of the plurality of uninterruptible power supplies is preferably connected by a signal line through which the power converters of the plurality of uninterruptible power supplies communicate their supply start states or supply stop states to each other, and when the integrated value becomes equal to or higher than the second start threshold and the shared current supply from any of the plurality of second power converters is started, a priority of a remaining second power converter is preferably raised, and the second start threshold corresponding to a raised priority is preferably assigned. According to this structure, even when the relatively small second start threshold corresponding to the raised priority is assigned after the shared current supply from any of the plurality of second power converters is started, and thereafter the shared current command increases, the shared current supply can be quickly started from the second power converter, the priority of which has been raised.

In the aforementioned uninterruptible power supply system according to the first aspect, the controller preferably performs control of comparing the shared current level according to a magnitude of the shared current command with a first stop threshold common to the plurality of uninterruptible power supplies, integrating a time in which the shared current level becomes equal to or lower than the first stop threshold, and stopping the shared current supply from the power converter when an integrated value becomes equal to or higher than a second stop threshold provided for each power converter to determine whether or not the shared current supply is stopped from the power converter. According to this structure, the controller stops the shared current supply from the power converter based on the shared current level according to the magnitude of the shared current command detected by its current detector without sampling a result (current value) detected by the current detector provided in another uninterruptible power supply and determining an appropriate number of necessary uninterruptible power supplies, and thus the shared current supply from the power converter can be quickly stopped. When the stop of shared current supply from the power converter is delayed, the shared current supplied from one uninterruptible power supply (power converter) to the load becomes relatively small. The efficiency of the power converter is better as the shared current from the power converter is larger. In other words, a decrease in the efficiency of the power converter due to the fact that the shared current supplied from one power converter to the load becomes relatively small can be significantly reduced or prevented.

In this case, the second stop threshold preferably decreases as the shared current level decreases. According to this structure, when the load current (shared current level) sharply decreases, the second stop threshold sharply decreases, and thus the integrated value quickly becomes equal to or higher than the second stop threshold. Thus, when the load current (shared current level) sharply decreases, the shared current supply from the power converter can be stopped more quickly.

In the aforementioned uninterruptible power supply system in which the shared current supply is stopped when the integrated value becomes equal to or higher than the second stop threshold, the first stop threshold preferably decreases as a number of power converters that supply shared current to the load decreases. According to this structure, when the number of power converters that supply the shared current to the load decreases, the shared current level is unlikely to become equal to or lower than the first stop threshold. That is, when the number of power converters that supply the shared current to the load decreases, a frequent decrease in the number of power converters that supply the shared current to the load can be significantly reduced or prevented.

In the aforementioned uninterruptible power supply system in which the shared current supply is stopped when the integrated value becomes equal to or higher than the second stop threshold, the plurality of uninterruptible power supplies preferably includes at least three uninterruptible power supplies, power converters provided in the at least three uninterruptible power supplies are preferably assigned to a first power converter that constantly supplies shared current to the load and a plurality of second power converters that starts or stops the shared current supply according to a magnitude of the shared current to the load, priorities are preferably set on the plurality of power converters, and larger second stop thresholds are preferably assigned as set priorities are higher. According to this structure, it becomes difficult to stop the shared current supply from the second power converter with a higher priority. Consequently, even when the load power increases again after the shared current supply from the second power converters is stopped due to an instantaneous decrease in the load power, for example, the shared current supply from the second power converter with a higher priority is not stopped, and thus the shortage of power to be supplied to the load can be significantly reduced or prevented.

In this case, when the shared current supply from any of the plurality of second power converters is stopped, the controller of an uninterruptible power supply including a remaining second power converter preferably temporarily stops control of determining whether or not the shared current supply is stopped from a second power converter of its uninterruptible power supply, and restarts control of determining whether or not the shared current supply is stopped from the second power converter of its uninterruptible power supply after an operation of stopping the shared current supply from any of the plurality of second power converters is completed. According to this structure, when the shared current supply from any of the plurality of second power converters is stopped, the controller of the uninterruptible power supply including the remaining second power converter temporarily stops control of determining whether or not the shared current supply is stopped from the second power converter of its uninterruptible power supply, and thus the stop of shared current supply from the plurality of second power converters in a relatively short time can be significantly reduced or prevented.

In the aforementioned uninterruptible power supply system according to the first aspect, the plurality of uninterruptible power supplies preferably includes at least three uninterruptible power supplies, power converters provided in the at least three uninterruptible power supplies are preferably assigned to a first power converter that constantly supplies shared current to the load and a plurality of second power converters that starts or stops the shared current supply according to a magnitude of the shared current to the load, priorities are preferably set on a plurality of the power converters, a cumulative time of power supply of the first power converter and a cumulative time of power supply of the second power converters are preferably calculated, and when a difference between the cumulative times of power supply of the first power converter and the second power converters is equal to or more than a predetermined set time, the power converter with a shorter cumulative time of power supply is preferably reassigned to the first power converter, and the power converter with a longer cumulative time of power supply is preferably reassigned to the second power converters. Furthermore, the priorities are preferably changed such that set priorities of the second power converters become higher as the cumulative time of power supply is shorter. According to this structure, the priorities are changed such that the set priorities of the second power converters become higher as the cumulative time of power supply is shorter, and thus the cumulative time of power supply can be averaged. Consequently, a failure and a decrease in the service life due to a heavy burden on some of the power converters can be significantly reduced or prevented.

In this case, when the first power converter fails, the second power converter with a higher priority among the plurality of second power converters is preferably switched to the first power converter. According to this structure, even when the first power converter fails, the first power converter that constantly supplies the shared current to the load can be ensured, and thus power can be stably supplied to the load.

In the aforementioned uninterruptible power supply system according to the first aspect, the plurality of uninterruptible power supplies preferably includes at least three uninterruptible power supplies, power converters provided in the at least three uninterruptible power supplies are preferably assigned to a first power converter that constantly supplies shared current to the load and a plurality of second power converters that starts or stops the shared current supply according to a magnitude of the shared current to the load, and the second power converter that has stopped the shared current supply to the load among the plurality of second power converters preferably waits while a phase of an internal inverter command waveform of the second power converter that has stopped the shared current supply to the load is synchronized with a phase of power supplied by the second power converter that has started the shared current supply to the load. According to this structure, the phases are synchronized in advance, and thus the shared current supply to the load can be quickly started from the second power converter that has stopped the shared current supply to the load.

In the aforementioned uninterruptible power supply system according to the first aspect, inductances between the plurality of uninterruptible power supplies and the load are preferably equal to each other. According to this structure, the shared current having the same magnitude can be easily supplied to the load.

An uninterruptible power supply according to a second aspect of the present invention includes a power converter that shares and supplies current to a load, a current detector that detects the current that flows through wiring that connects the power converter to another power converter, a shared current command generator that generates a shared current command, which indicates a command value for determining a value of shared current to be supplied from the power converter to the load based on the current detected by the current detector, and a controller that controls start or stop of shared current supply from the power converter to the load based on the shared current command.

Similarly to the aforementioned uninterruptible power supply system according to the first aspect, the uninterruptible power supply according to the second aspect of the present invention can quickly switch between a state in which shared current supply to the load has been stopped and a state in which shared current is being supplied to the load. Furthermore, the uninterruptible power supply according to the second aspect can quickly switch between a state in which shared current supply to the load has been stopped and a state in which shared current is being supplied to the load even when one power converter and another power converter are provided in the single uninterruptible power supply.

In the aforementioned uninterruptible power supply according to the second aspect, the controller preferably performs control of comparing a shared current level according to a magnitude of the shared current command with a first start threshold common to the power converter and the another power converter, integrating a time in which the shared current level becomes equal to or higher than the first start threshold, and starting the shared current supply from the power converter when an integrated value becomes equal to or higher than a second start threshold provided for each of the power converter and the another power converter to determine whether or not the shared current supply is started from the power converter. According to this structure, the controller quickly starts the shared current supply from the power converter without sampling a detection result (current value) of another power converter and determining an appropriate number of necessary power converters, and thus excessive current supply from the power converter can be significantly reduced or prevented.

In this case, the controller preferably performs control of comparing the shared current level according to the magnitude of the shared current command with the first start threshold common to the power converter and the another power converter and subtracting a time in which the shared current level becomes lower than the first start threshold from the integrated value when the shared current level becomes lower than the first start threshold after the shared current level becomes equal to or higher than the first start threshold.

In the aforementioned uninterruptible power supply in which the shared current supply is started when the integrated value becomes equal to or higher than the second start threshold, the second start threshold preferably decreases as the shared current level increases. According to this structure, when the load current (shared current level) sharply increases, the shared current supply from the power converter can be started more quickly.

In the aforementioned uninterruptible power supply according to the second aspect, the controller preferably performs control of comparing the shared current level according to a magnitude of the shared current command with a first stop threshold common to the power converter and the another power converter, integrating a time in which the shared current level becomes equal to or lower than the first stop threshold, and stopping the shared current supply from the power converter when an integrated value becomes equal to or higher than a second stop threshold provided for each of the power converter and the another power converter to determine whether or not the shared current supply is stopped from the power converter. According to this structure, the controller quickly stops the shared current supply from the power converter without sampling a detection result (current value) of another power converter and determining an appropriate number of necessary power converters, and thus a decrease in the efficiency of the power converter can be significantly reduced or prevented.

In this case, the second stop threshold preferably decreases as the shared current level decreases. According to this structure, when the load current (shared current level) sharply decreases, the shared current supply from the power converter can be stopped more quickly.

In the aforementioned uninterruptible power supply according to the second aspect, inductances between the power converter and the another power converter and the load are preferably equal to each other. According to this structure, the shared current having the same magnitude can be easily supplied to the load.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram illustrating the priorities of power converters;

DESCRIPTION OF THE PREFERRED EMBODIMENTS

Embodiments of the present invention are hereinafter described with reference to the drawings.

First Embodiment

The structure of an uninterruptible power supply system 1 according to a first embodiment is now described with reference to FIGS. 1 to 16.

Figure 1:
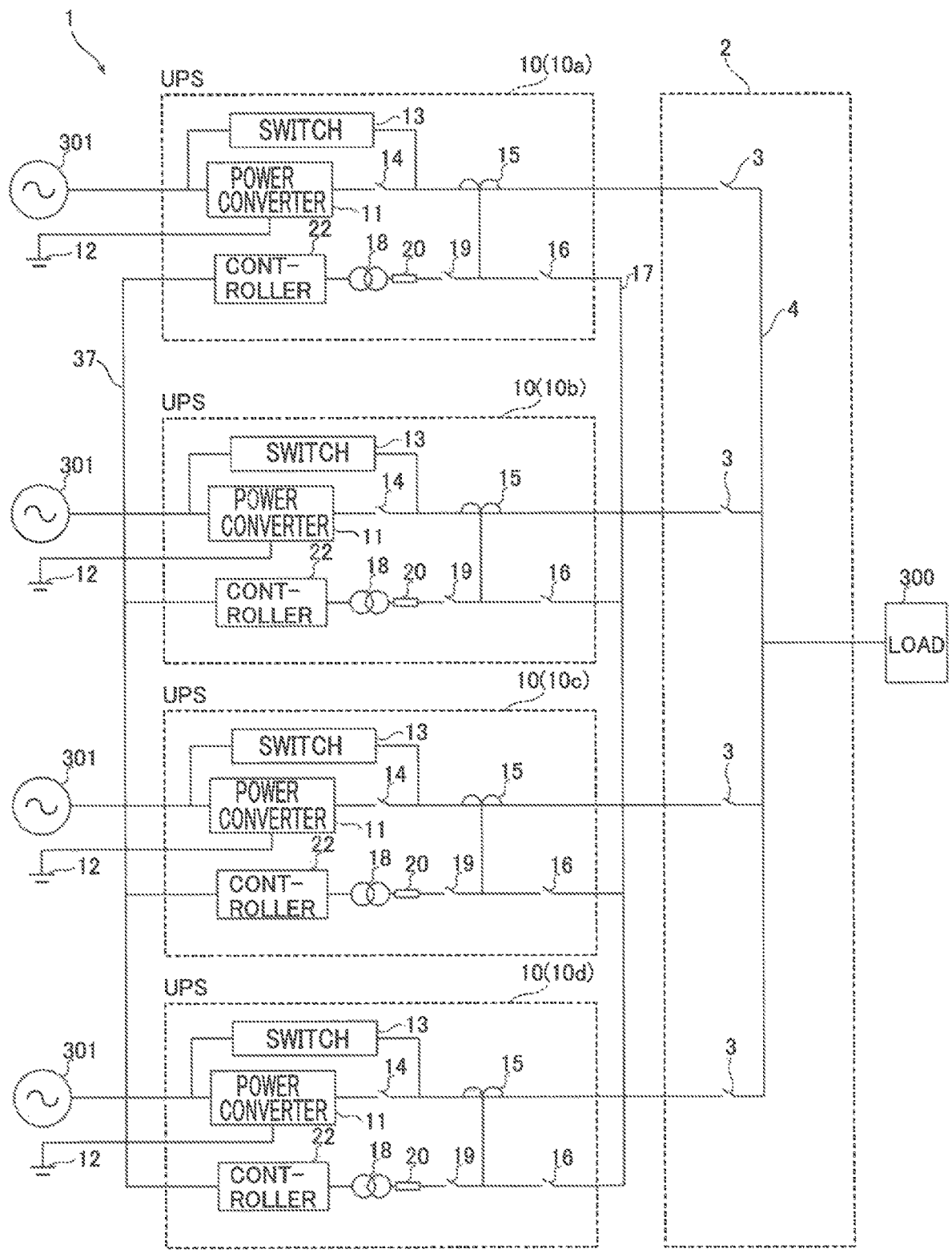
FIG. 1 is a block diagram of an uninterruptible power supply system according to a first embodiment of the present invention.

As shown in FIG. 1, the uninterruptible power supply system 1 includes a plurality of (at least three) uninterruptible power supplies 10 (uninterruptible power supplies 10a to 10d) connected in parallel to each other to a load 300. The structures of the uninterruptible power supplies 10a to 10d are the same as each other. The uninterruptible power supply system 1 supplies power from the plurality of uninterruptible power supplies 10 to the load 300 via breakers 3 in an output bus board 2.

Figure 2:
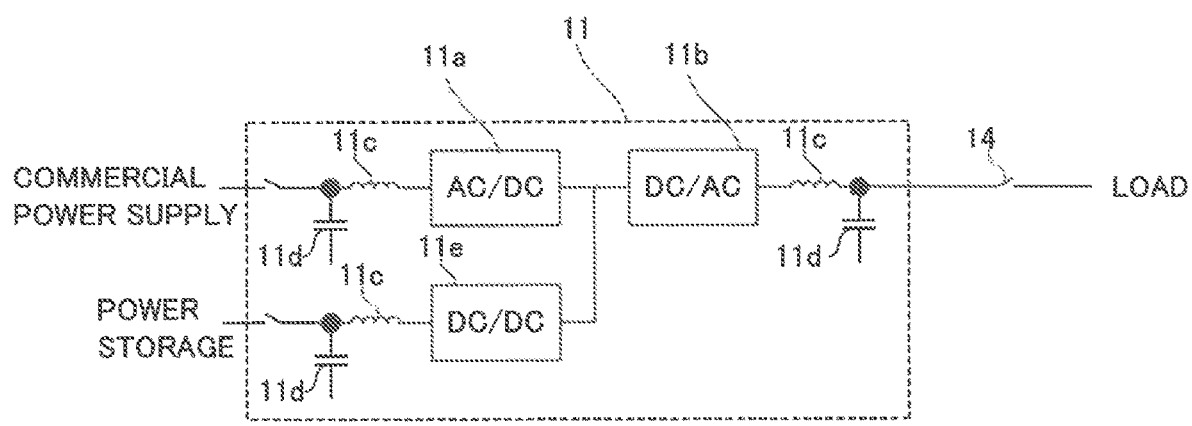
FIG. 2 is a block diagram of a power converter according to the first embodiment of the present invention.

The uninterruptible power supplies 10 each include a power converter 11. As shown in FIG. 2, the power converter 11 includes a rectifier (AC/DC) 11a that receives AC power from a commercial power supply 301 and converts the received AC power into DC power and an inverter (DC/AC) 11b that converts the DC power, into which the rectifier 11a converts the AC power, into AC power. A reactor 11c for a high-frequency filter and a capacitor 11d for a high-frequency filter are provided between the commercial power supply 301 and the rectifier 11a. Furthermore, a reactor 11c for a high-frequency filter and a capacitor 11d for a high-frequency filter are provided between the load 300 and the inverter 11b. A power storage 12 is connected between the rectifier 11a and the inverter 11b via a DC/DC converter (DC/DC) 11e. In addition, a reactor 11c for a high-frequency filter and a capacitor 11d for a high-frequency filter are provided between the DC/DC converter 11e and the power storage 12.

As shown in FIG. 1, the uninterruptible power supplies 10 each include a bypass circuit switch 13. The bypass circuit switch 13 supplies the AC power from the commercial power supply 301 to the load 300 not via (bypassing) the power converter 11 when an abnormality occurs in the power converter 11 or when an overcurrent flows through the power converter 11. Furthermore, a circuit breaker 14 that shuts off output from the power converter 11 is provided on the output side of the power converter 11. In addition, a current transformer (CT) 15 is provided on the load 300 side of the circuit breaker 14. The CT 15 detects an output current from the power converter 11. A switch 16 that connects the secondary side of the CT 15 to the secondary sides of the CTs 15 of the other uninterruptible power supplies 10 is provided on the secondary side of the CT 15. The secondary side of the CT 15 of its uninterruptible power supply 10 and the secondary sides of the CTs 15 of the other uninterruptible power supplies 10 are connected to each other via wiring 17. Thus, the average current (the average value of the current) obtained by dividing current to be supplied to the load 300 by the number of uninterruptible power supplies 10 that share and supply the current to be supplied to the load 300 flows through the wiring 17. According to the first embodiment, inductances between the respective plurality of uninterruptible power supplies 10 (power converters 11) and the load 300 are equal to each other.

According to the first embodiment, a current transformer (CT) 18 that detects current that flows through the wiring 17 that connects the power converters 11 of the plurality of uninterruptible power supplies 10 in parallel to each other is provided. The CT 18 is connected to the secondary side of the CT 15 via a switch 19 and a resistor 20. The CT 18 is an example of a "current detector" in the claims.

Figure 3:
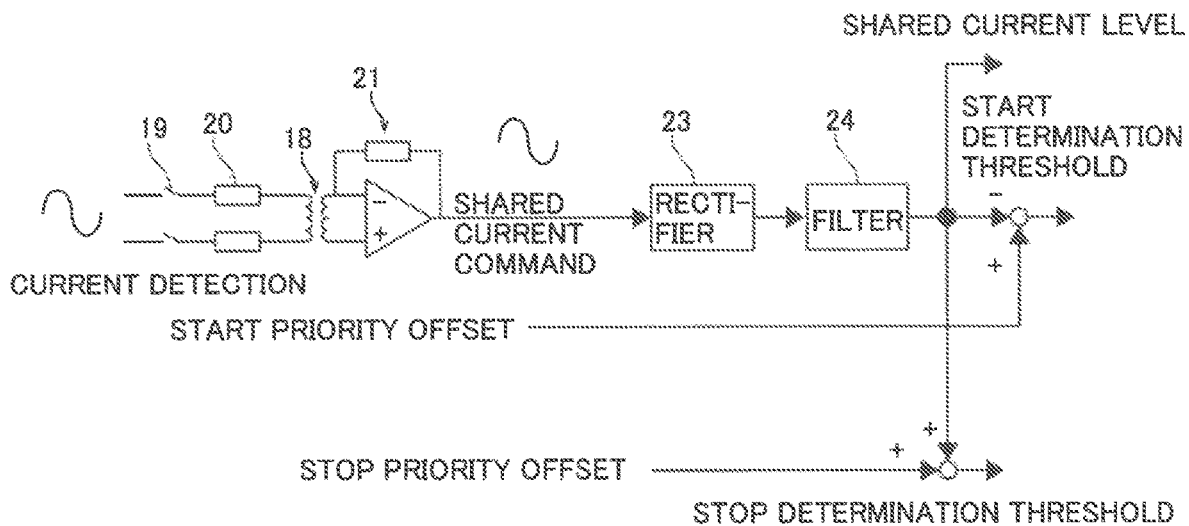
FIG. 3 is a diagram illustrating control of starting shared current supply.

According to the first embodiment, as shown in FIG. 3, a current-voltage conversion circuit 21 that generates a shared current command, which indicates a command value for determining the value of shared current to be supplied from the plurality of power converters 11 to the load 300 based on the current detected by the CT 18, is provided. The current-voltage conversion circuit 21 is an example of a "shared current command generator" in the claims. Specifically, when the switch 19 is turned on, the CT 18 is connected to the secondary side of the CT 15 via the resistor 20, and the shared current to be supplied to the load 300 is shunted to the other uninterruptible power supplies 10. Thus, the shared current command (voltage) corresponding to the shunted current (shared current) is generated by the current-voltage conversion circuit 21.

According to the first embodiment, a controller 22 controls supply start or supply stop of the shared current to be supplied from its power converter 11 to the load 300, based on the shared current command. Specifically, the controller 22 rectifies the shared current command, which is the received AC, by the rectifier 23, and then removes ripples by a filter 24 to generate a shared current level. Then, the controller 22 sets a value obtained by subtracting the shared current level from a start priority offset described below as a start determination threshold. It should be noted that the start determination threshold is provided for each power converter 11, and is a threshold for determining whether or not shared current supply is started from the power converter 11. Furthermore, the controller 22 sets a value obtained by adding the shared current level to the stop priority offset described below as a stop determination threshold. The stop determination threshold is provided for each power converter 11, and is a threshold for determining whether or not shared current supply is stopped from the power converter 11. The start determination threshold is an example of a "second start threshold" in the claims. The stop determination threshold is an example of a "second stop threshold" in the claims.

As shown in FIG. 6, the start priority offset is a value corresponding to a time period (time) according to each of the priorities of the plurality of uninterruptible power supplies 10, and decreases in value as the priority is higher. For example, a value with a priority of 3 is 10 seconds, and a value with a priority of 4 is 20 seconds. Thus, according to the first embodiment, the priorities for supply start are set on the plurality of uninterruptible power supplies 10 (power converters 11), and as the set priorities are higher, the smaller start determination thresholds are assigned.

As shown in FIG. 6, the stop priority offset is a value corresponding to a time period (time) according to each of the priorities of the plurality of uninterruptible power supplies 10, and increases in value as the priority is higher contrary to the start priority offset. For example, a value with a priority of 3 is 400 seconds, and a value with a priority of 4 is 300 seconds. Thus, according to the first embodiment, the priorities for supply stop are set on the plurality of uninterruptible power supplies 10 (power converters 11), and as the set priorities are higher, the larger stop determination thresholds are assigned.

Thus, in the uninterruptible power supply system 1, the uninterruptible power supply 10 having a higher priority is more likely to start shared current supply, and the uninterruptible power supply 10 having a higher priority is less likely to stop shared current supply. The structure for starting shared current supply is described below.

(Structure for Starting Supply)

Figure 4:
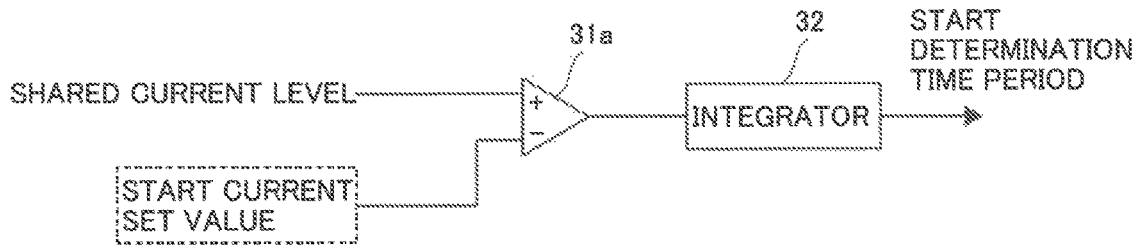
FIG. 4 is another diagram illustrating control of starting shared current supply.
Figure 5:
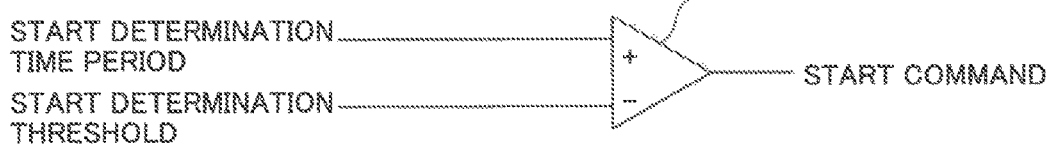
FIG. 5 is yet another diagram illustrating control of starting shared current supply.

According to the first embodiment, as shown in FIG. 4, the controller 22 compares the shared current level according to the magnitude of the shared current command and a start current set value common to the plurality of uninterruptible power supplies 10 by a comparator 31a. Then, the controller 22 integrates a time in which the shared current level becomes equal to or higher than the start current set value. Then, as shown in FIG. 5, when determining by the comparator 31b that the integrated value (start determination time period) integrated by an integrator 32 has become equal to or higher than the start determination threshold provided for each power converter 11, the controller 22 performs control of starting shared current supply from the power converter 11. In other words, a command for starting shared current supply is output to the power converter 11 corresponding to the start determination threshold. Furthermore, the controller 22 compares the shared current level according to the magnitude of the shared current command and the start current set value common to the plurality of uninterruptible power supplies 10, and performs control of subtracting a time in which the shared current level becomes lower than the start current set value from the integrated value when the shared current level becomes lower than the start current set value after the shared current level becomes equal to or higher than the start current set value.

Figure 7:
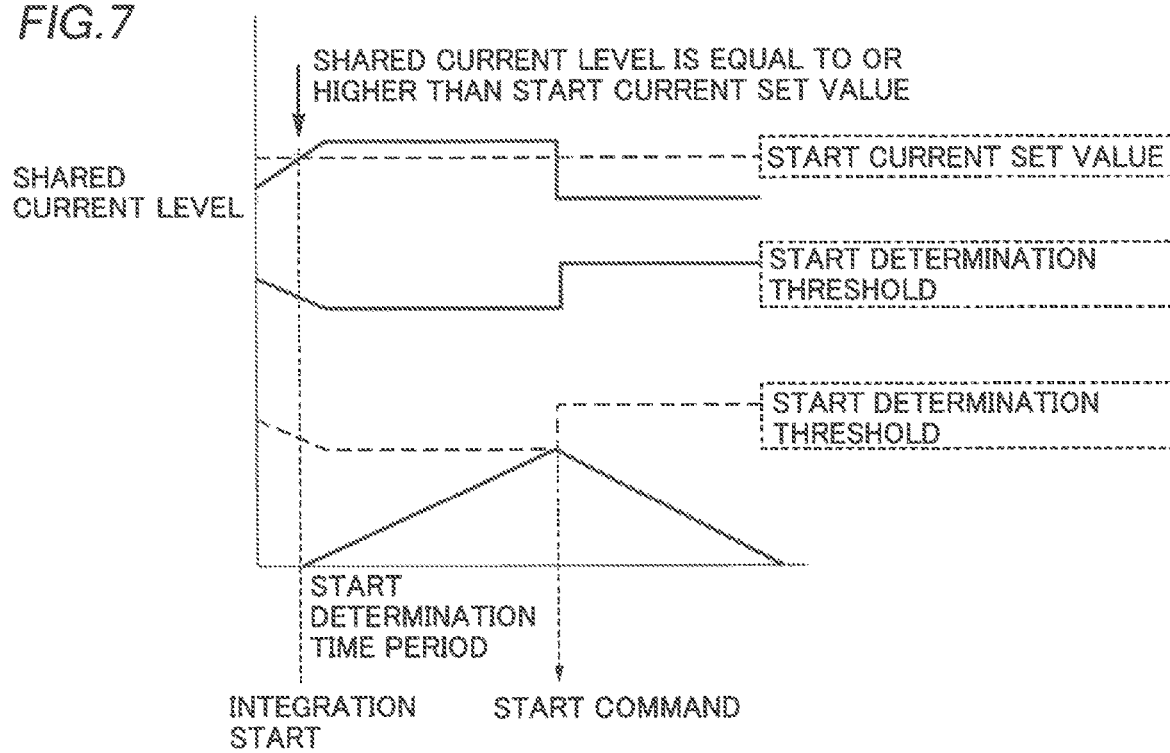
FIG. 7 is a diagram illustrating the start of shared current supply.

For example, as shown in FIG. 7, as power used by the load 300 increases, the shared current command increases. Along with this, the shared current level increases. Then, a time in which the shared current level is equal to or higher than the start current set value is integrated by the integrator 32. When the shared current level becomes less than the start current set value, the integrator 32 performs subtraction. Thus, a triangular graph in FIG. 7 shows the integrated value (start determination time period). When the integrated value becomes equal to or higher than the start determination threshold, shared current supply from the power converter 11 having the highest priority is started. The magnitude of the start determination threshold is different for each priority.

According to the first embodiment, as shown in FIG. 7, the start determination threshold decreases as the shared current level increases. That is, the start determination threshold has an inverted characteristic with respect to the shared current level. Specifically, the start determination threshold and the shared current level are line-symmetrical with respect to an axis line along the time axis (horizontal axis).

Figure 8:
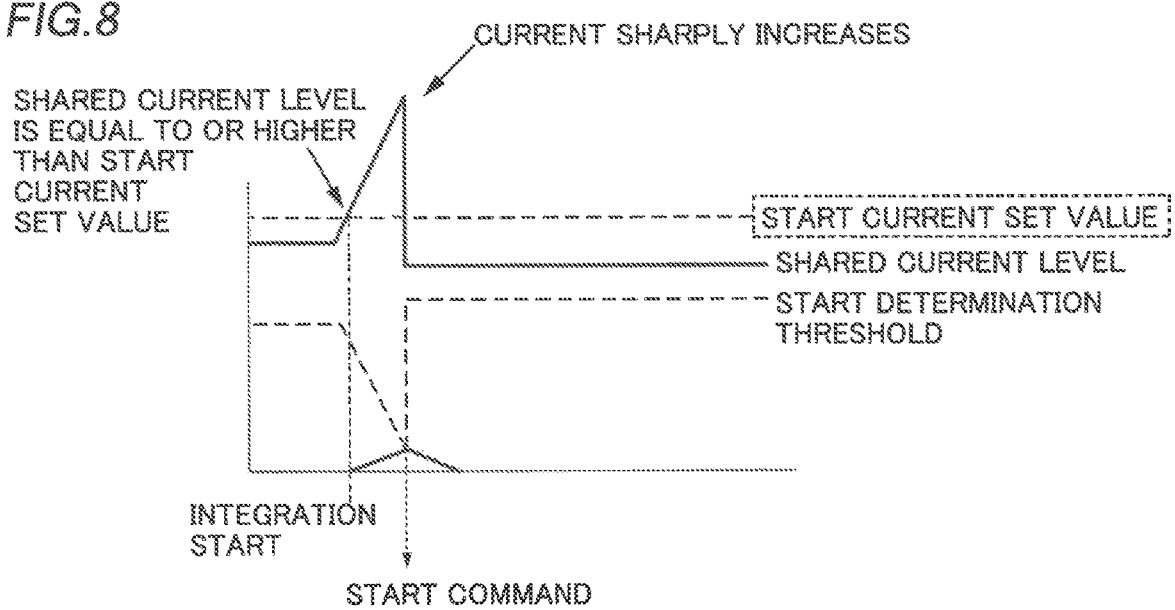
FIG. 8 is another diagram illustrating the start of shared current supply.

For example, when the load 300 gently increases (when normal), as shown in FIG. 7, the start determination threshold also gently decreases. Therefore, a relatively long time is required until the integrated value reaches the start determination threshold. For example, shared current supply from one uninterruptible power supply 10 is started every 10 seconds. On the other hand, when the load 300 sharply increases (when abnormal), as shown in FIG. 8, the start determination threshold also sharply decreases. Therefore, the integrated value reaches the start determination threshold in a relatively short time. For example, shared current supply from the plurality of uninterruptible power supplies 10 is started in about 2 seconds.

Figure 9:
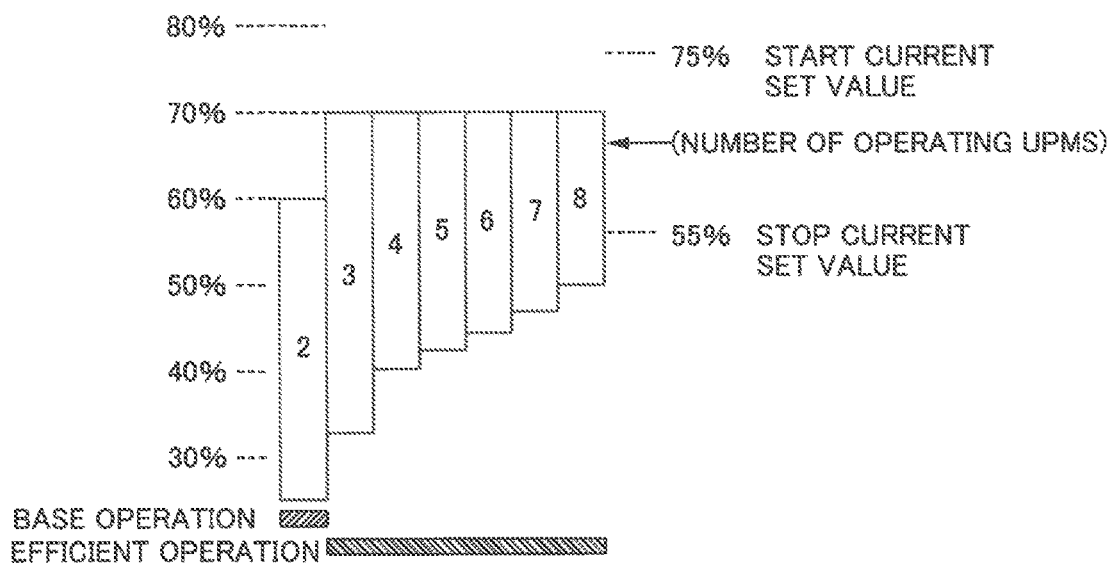
FIG. 9 is a diagram illustrating a start current set value and a stop current set value according to the first embodiment of the present invention.

According to the first embodiment, as shown in FIG. 9, the start current set value increases as the number of power converters 11 that supply the shared current to the load 300 increases. For example, when eight uninterruptible power supplies 10 (power converters 11) are provided in the uninterruptible power supply system 1, the two uninterruptible power supplies 10 (power converters 11) constantly supply the shared current to the load 300 (base operation). The remaining six uninterruptible power supplies 10 (power converters 11) start or stop the supply according to the magnitude of the shared current to the load 300 (efficient operation). When the two uninterruptible power supplies 10 (power converters 11) supply the shared current, the start current set value is set to 60%. When the three or more uninterruptible power supplies 10 (power converters 11) supply the shared current, the start current set value is set to 70%. The power converters 11 that perform the base operation are examples of a "first power converter" in the claims. The power converters 11 that perform the efficient operation are examples of a "second power converter" in the claims.

According to the first embodiment, the power converters 11 that have stopped shared current supply to the load 300 among the power converters 11 that start or stop the supply according to the magnitude of the shared current to the load 300 (perform the efficient operation) wait while the phases of internal inverter command waveforms of the power converters 11 that have stopped shared current supply to the load 300 are synchronized with the phase of power supplied by the power converters 11 that have started shared current supply to the load 300. Specifically, first, each of the controllers 22 of the uninterruptible power supplies 10 in a standby state takes the inverter output voltage of its power converter 11 (inverter 11b) and the bus voltage of a bus 4 in which the breakers 3 are disposed.

Figure 10:
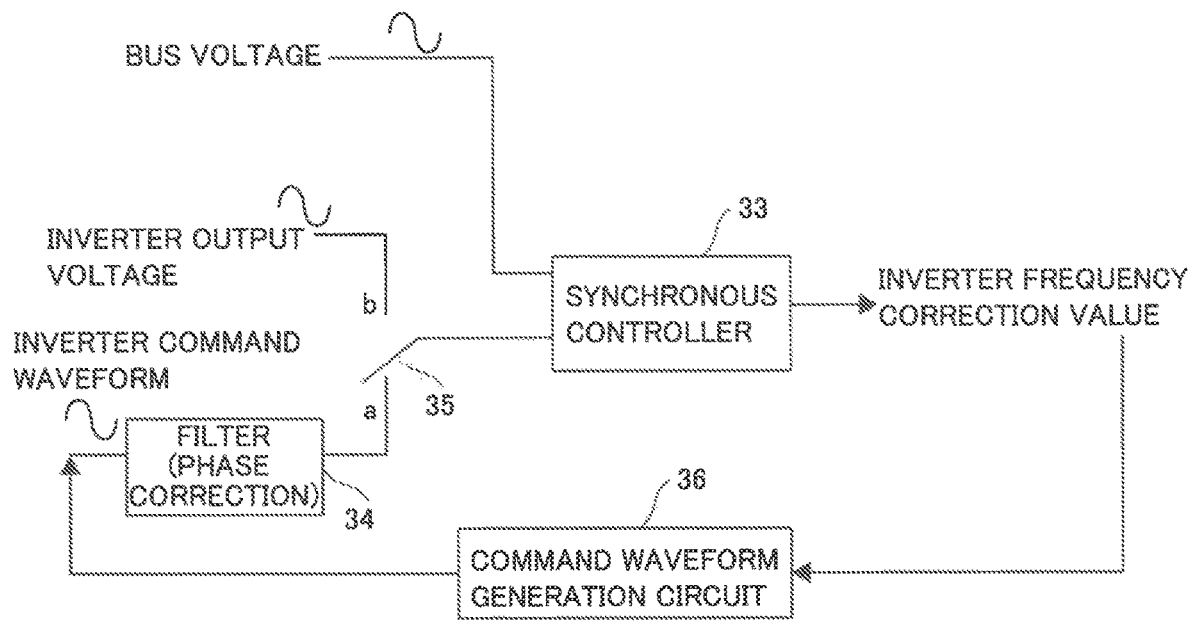
FIG. 10 is a diagram illustrating synchronous control.

Then, as shown in FIG. 10, the bus voltage (the voltage of the bus 4 in which the breakers 3 are provided) is taken by a synchronous controller 33. In addition, the inverter output voltage and an inverter command waveform phase-corrected by a filter 34 are taken by the synchronous controller 33 via a selector 35. Here, no inverter output voltage is generated in each of the uninterruptible power supplies 10 in a standby state, and thus the side a of the selector 35 is selected. Thus, the inverter command waveform is taken by the synchronous controller 33. Consequently, the synchronous controller 33 outputs an inverter frequency correction value to a command waveform generation circuit 36 such that the waveform phase of the phase-corrected inverter command waveform and the phase of the bus voltage are synchronized with each other. Consequently, the command waveform generation circuit 36 adjusts the frequency of the inverter command waveform.

Thus, the power converters 11 of the uninterruptible power supplies 10 in a standby state are in a state in which the phases of the inverter output voltages of the power converters 11 of the uninterruptible power supplies 10 in a standby state are synchronized with the phases of the inverter output voltages of the power converters 11 of the other uninterruptible power supplies 10 that supply the shared current and the phase of the bus voltage. When inverter output voltages are generated from the power converters 11 commanded to start shared current supply in the uninterruptible power supplies 10 in a standby state, the selector 35 is switched to the side b. Thus, the power converters 11 of the uninterruptible power supplies 10 that have been switched from a standby state to a supply start state supply the shared current via the circuit breaker 14, which has been turned on, in a state in which the inverter output voltages of the power converters 11 of the uninterruptible power supplies 10 in a standby state are synchronized with the inverter output voltages of the power converters 11 of the other uninterruptible power supplies 10 and the bus voltage. Consequently, shared current supply can be started in a relatively short time (several seconds) after a command to start shared current supply is given.

According to the first embodiment, as shown in FIG. 1, the controllers 22 respectively provided in the plurality of uninterruptible power supplies 10 are connected to each other by a signal line 37 through which the power converters 11 of the plurality of uninterruptible power supplies 10 can communicate their supply start states or supply stop states to each other. The power converters 11 of the plurality of uninterruptible power supplies 10 share their supply start states or supply stop states. Furthermore, the controllers 22 respectively provided in the plurality of uninterruptible power supplies 10 share their start current set values, start determination thresholds, stop current set values described below, stop determination thresholds, and priorities.

Figure 11:
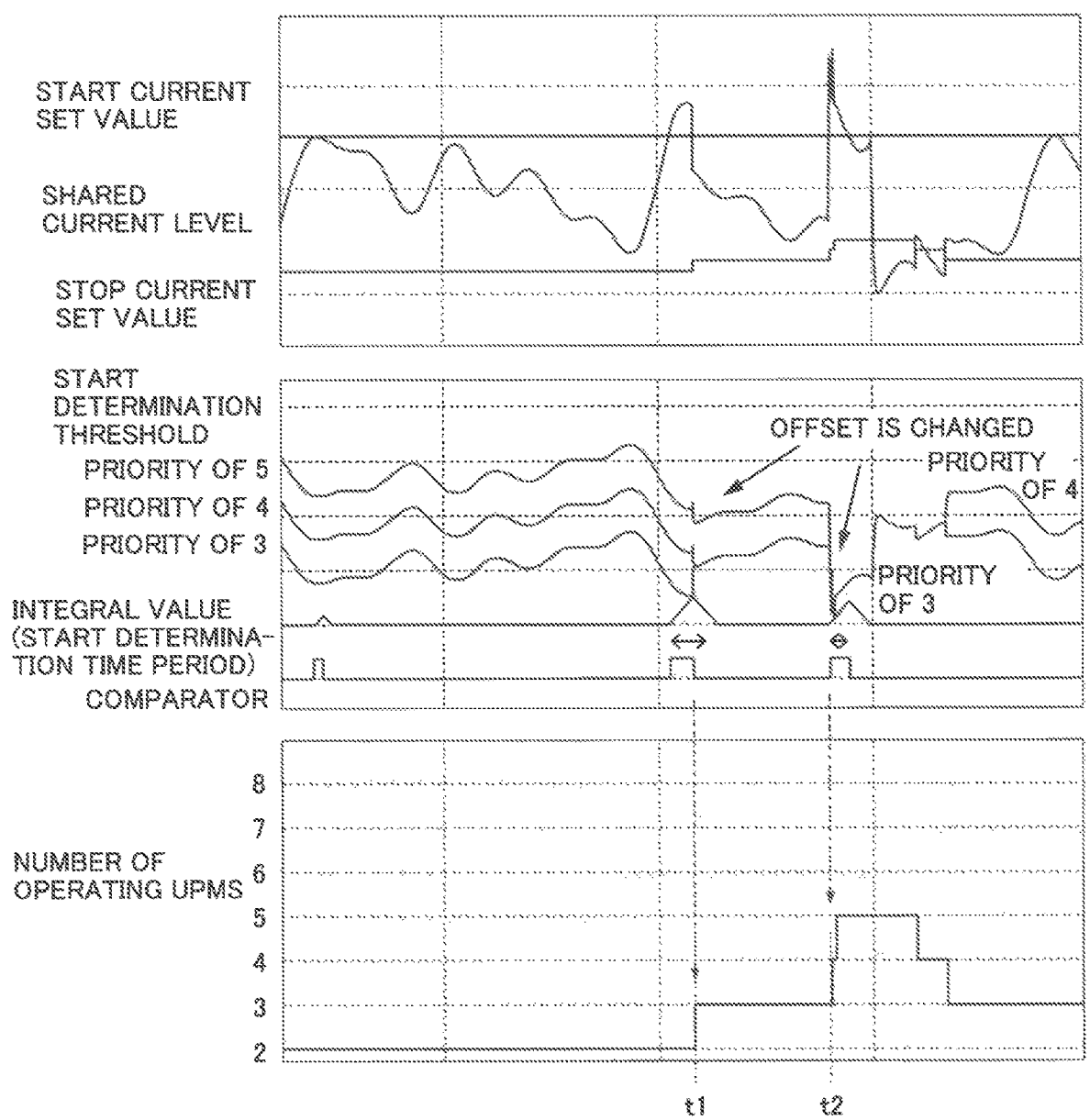
FIG. 11 is yet another diagram illustrating the start of shared current supply.

The operation of starting shared current supply of the uninterruptible power supply system 1 is now specifically described with reference to FIG. 11. In FIG. 11, only three start determination thresholds with high priorities are shown. Furthermore, it is assumed that the shared current is initially supplied from the two uninterruptible power supplies 10 (base operation only).

As shown in FIG. 11, the shared current level fluctuates as the load 300 varies. When the comparator 31a determines that the shared current level has become equal to or higher than the start current set value, the integrator 32 adds the integrated value. Thus, the integrated value becomes equal to or higher than the start determination threshold at time t1. Consequently, shared current supply from the third uninterruptible power supply 10 is started.

According to the first embodiment, when the integrated value becomes equal to or higher than the start determination threshold and shared current supply from any of the plurality of power converters 11 is started, the priorities of the remaining power converters 11 are raised, and the start determination thresholds corresponding to the raised priorities are assigned. Specifically, one obtained by subtracting the number of power converters 11 shifted to an efficient operation state from the priority is set as a new priority.

For example, it is assumed that at the time t1, shared current supply from one power converter 11 having a priority of 3 and a start determination threshold corresponding to a start priority offset of 10 seconds has been started. In this case, the priority of the power converter 11 having a priority of 4 and a start determination threshold corresponding to a start priority offset of 20 seconds is raised to 3 (=4−1), and the start determination threshold of this power converter 11 becomes a start determination threshold corresponding to a start priority offset of 10 seconds. Similarly, the priority of the power converter 11 having a priority of 5 and a start determination threshold corresponding to a start priority offset of 30 seconds is raised to 4 (=5−1), and the start determination threshold of this power converter 11 becomes a start determination threshold corresponding to a start priority offset of 20 seconds.

Furthermore, it is assumed that the shared current level has sharply increased due to a sudden overload. Thus, at time t2, the integrated value becomes equal to or higher than the start determination threshold, and shared current supply from the fourth uninterruptible power supply 10 is started. The priority of the power converter 11 having a priority of 4 is raised to 3. Thus, the integrated value becomes equal to or higher than the start determination threshold in a short time. Consequently, following the shared current supply from the fourth uninterruptible power supply 10, shared current supply from the fifth uninterruptible power supply 10 is started without interruption. The structure for stopping shared current supply is described below.

(Structure for Stopping Supply)

Figure 12:
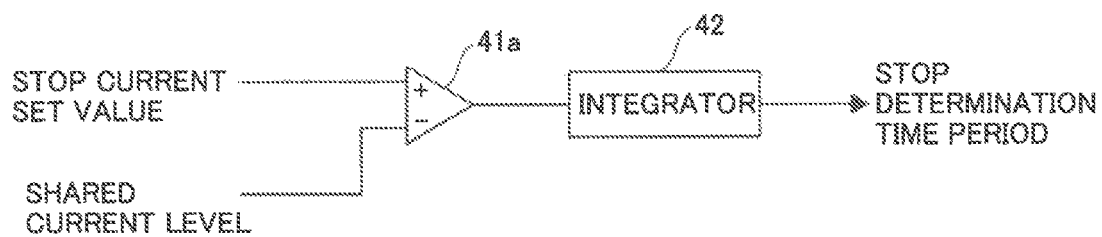
FIG. 12 is a diagram illustrating control of stopping shared current supply.
Figure 13:
FIG. 13 is another diagram illustrating control of stopping shared current supply.

According to the first embodiment, as shown in FIG. 12, the controller 22 compares the shared current level according to the magnitude of the shared current command and the stop current set value common to the plurality of uninterruptible power supplies 10 by a comparator 41a. Then, the controller 22 integrates a time in which the shared current level becomes equal to or lower than the stop current set value by an integrator 42. As shown in FIG. 13, when determining by the comparator 41b that the integrated value (stop determination time period) has become equal to or higher than the stop determination threshold provided for each power converter 11, the controller 22 performs control of stopping shared current supply from the power converter 11. In other words, a command for stopping shared current supply is output to the power converter 11 corresponding to the stop determination threshold.

Figure 14:
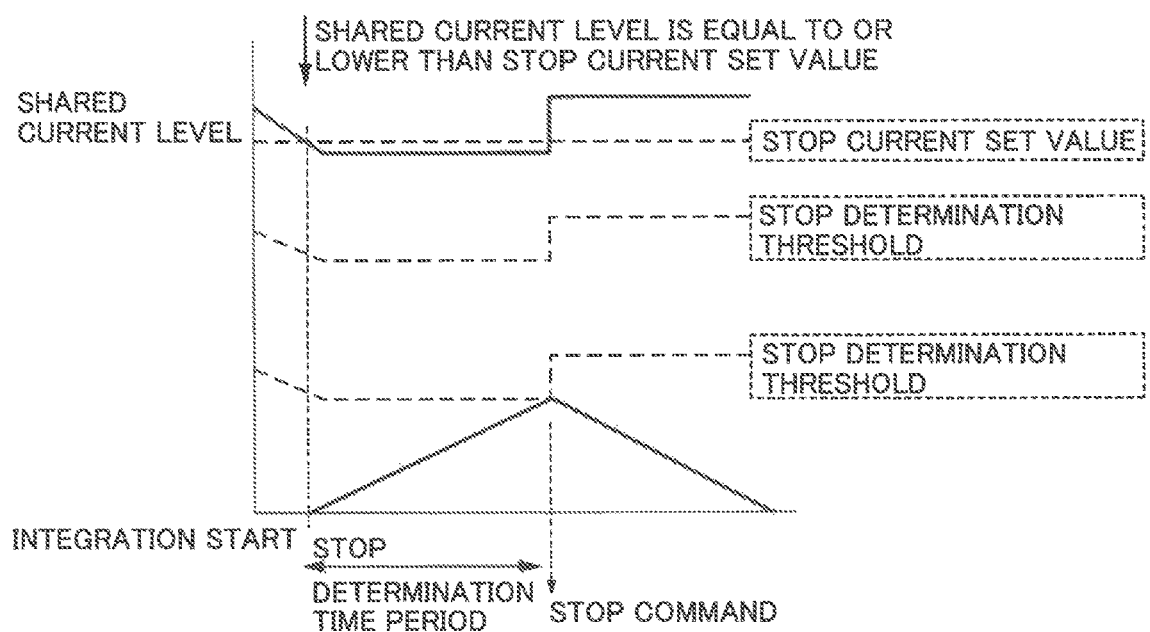
FIG. 14 is a diagram illustrating the stop of shared current supply.

For example, as shown in FIG. 14, as the power used by the load 300 decreases, the shared current command decreases. Along with this, the shared current level decreases. Then, a time in which the shared current level is equal to or lower than the stop current set value is integrated by the integrator 42. When the shared current level exceeds the stop current set value, the integrator 42 performs subtraction. Thus, a triangular graph in FIG. 14 shows the integrated value (stop determination time period). When the integrated value becomes equal to or higher than the stop determination threshold, shared current supply from the power converter 11 having the lowest priority (in an example of FIG. 15, a priority 5 of priorities 3 to 5,) is stopped. The magnitude of the stop determination threshold is different for each priority.

According to the first embodiment, the stop determination threshold decreases as the shared current level decreases. That is, the stop determination threshold has a similar characteristic (similar figure) to the shared current level. Specifically, the stop determination threshold has a waveform that matches the waveform of the shared current level. That is, when the load factor (shared current level) increases, the stop determination threshold also increases, and when the load factor (shared current level) decreases, the stop determination threshold also decreases.

According to the first embodiment, as shown in FIG. 9, the stop current set value is varied so as to decrease as the number of power converters 11 that supply the shared current to the load 300 decreases. For example, when the two uninterruptible power supplies 10 (power converters 11) supply the shared current, the stop current set value is set to less than 30%. Each time the number of uninterruptible power supplies 10 (power converters 11) that supply the shared current increases one by one, the stop current set value increases. Thus, frequent repetition of the start and stop of shared current supply due to the load pulsation is significantly reduced or prevented.

According to the first embodiment, when shared current supply from any of the plurality of power converters 11 is stopped in order to perform the efficient operation, each of the controllers 22 of the uninterruptible power supplies 10 including the remaining power converters 11 temporarily stops control of determining whether or not shared current supply is stopped from the power converter 11 of its uninterruptible power supply 10. Then, after the operation of stopping shared current supply from any of the plurality of power converters 11 in order to perform the efficient operation is completed, each of the controllers 22 performs control of restarting control of determining whether or not shared current supply is stopped from the power converter 11 of its uninterruptible power supply 10. That is, in the example shown in FIG. 14, during the operation of stopping shared current supply from the power converter 11 having a stop determination threshold corresponding to a priority of 5, determination as to whether or not shared current supply is stopped from the power converters 11 having stop determination thresholds corresponding to stop priority offsets of 300 seconds, 200 seconds, and 100 seconds is temporarily stopped.

Figure 15:
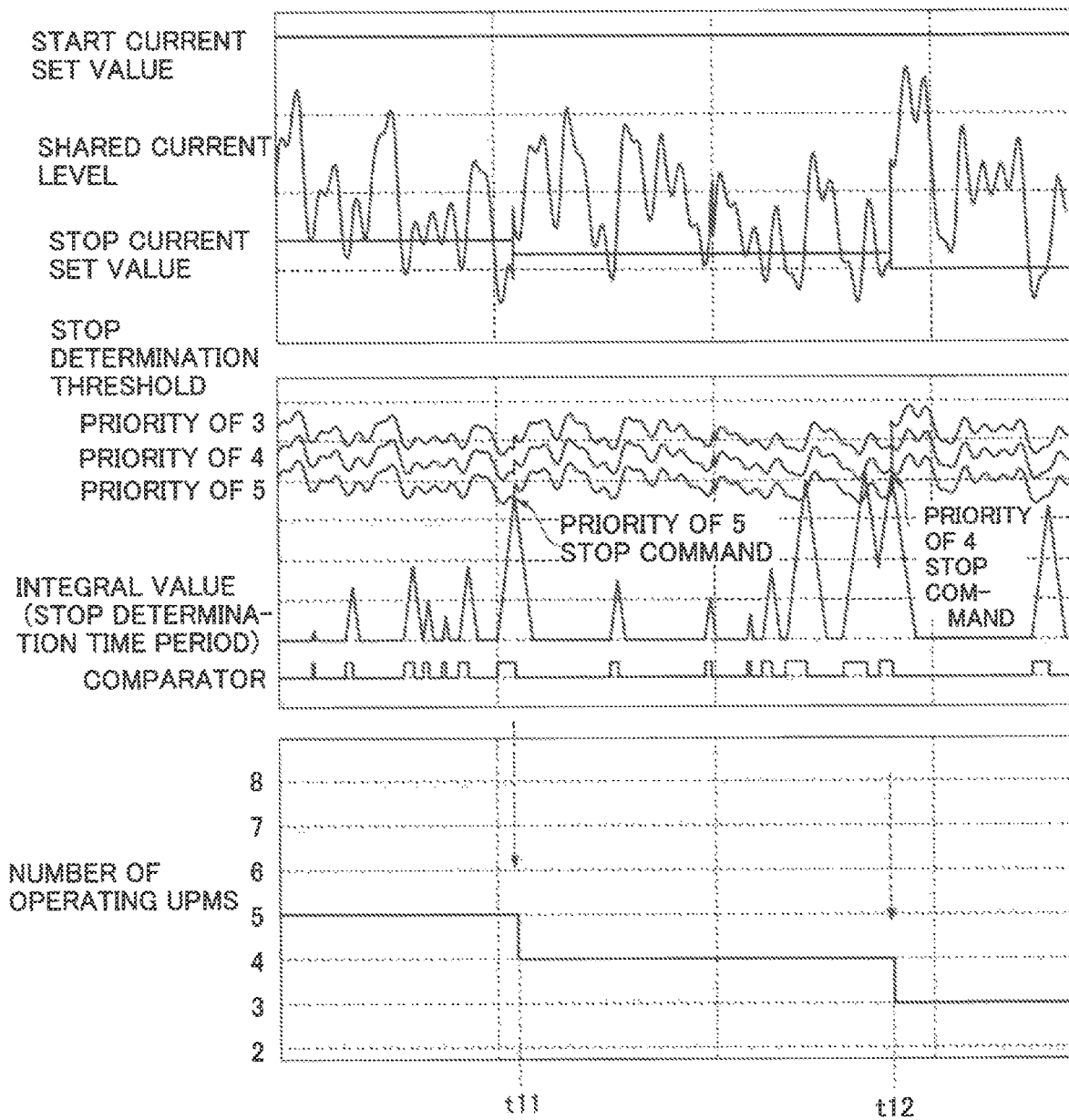
FIG. 15 is another diagram illustrating the stop of shared current supply.

The operation of stopping shared current supply of the uninterruptible power supply system 1 is now specifically described with reference to FIG. 15. In FIG. 15, only three stop determination thresholds with high priorities are shown. Furthermore, it is assumed that the shared current is initially supplied from the five uninterruptible power supplies 10.

As shown in FIG. 15, the shared current level fluctuates as the load 300 varies. When the comparator 41a determines that the shared current level has become equal to or higher than the stop current set value, the integrator 42 adds the integrated value. Thus, the integrated value becomes equal to or higher than the stop determination threshold at time t11. Consequently, shared current supply from the fifth uninterruptible power supply 10 is stopped. Similarly at time t12, the integrated value becomes equal to or higher than the stop determination threshold. Consequently, shared current supply from the fourth uninterruptible power supply 10 is stopped.

In the operation of stopping shared current supply, the priority is not raised. This is because it is not necessary to hasten the operation of stopping the supply, and the stop of shared current supply from the plurality of uninterruptible power supplies 10 in a short time is significantly reduced or prevented. A method for determining the priorities is described below.

(Method for Determining Priorities)

According to the first embodiment, it is assumed that the priorities are preset on the plurality of uninterruptible power supplies 10 (power converters 11). The controllers 22 calculate the cumulative time of power supply of the power converters 11 that perform the base operation and the cumulative time of power supply of the power converters 11 that perform the efficient operation. When a difference between the cumulative time of power supply of the power converters 11 that perform the base operation and the cumulative time of power supply of the power converters 11 that perform the efficient operation is equal to or more than a predetermined set time (such as 200,000 hours), the priorities are changed such that the set priorities become higher as the cumulative time of power supply is shorter. Thus, the power converter 11 with a shorter cumulative time of power supply is reassigned to a power converter 11 that performs the base operation. In addition, the power converter 11 with a longer cumulative time of power supply is reassigned to a power converter 11 that performs the efficient operation. For example, as shown in FIG. 6 (upper portion), the power converters 11 with priorities of 1 and 2 are assigned to power converters 11 that perform the base operation. The power converters 11 with priorities of 3 to 6 are assigned to power converters 11 that perform the efficient operation.

According to the first embodiment, as shown in FIG. 6 (lower portion), when the power converter 11 that performs the base operation fails, the power converter 11 with a higher priority among the plurality of power converters 11 that performs the efficient operation is switched to a power converter 11 that performs the base operation. For example, when the power converter 11 with a priority of 1 fails, the power converter 11 with a priority of 3 is assigned to a power converter 11 that performs the base operation. Note that the power converters 11 with priorities of 4 to 6 remain to be power converters 11 that perform the efficient operation.

Figure 16:
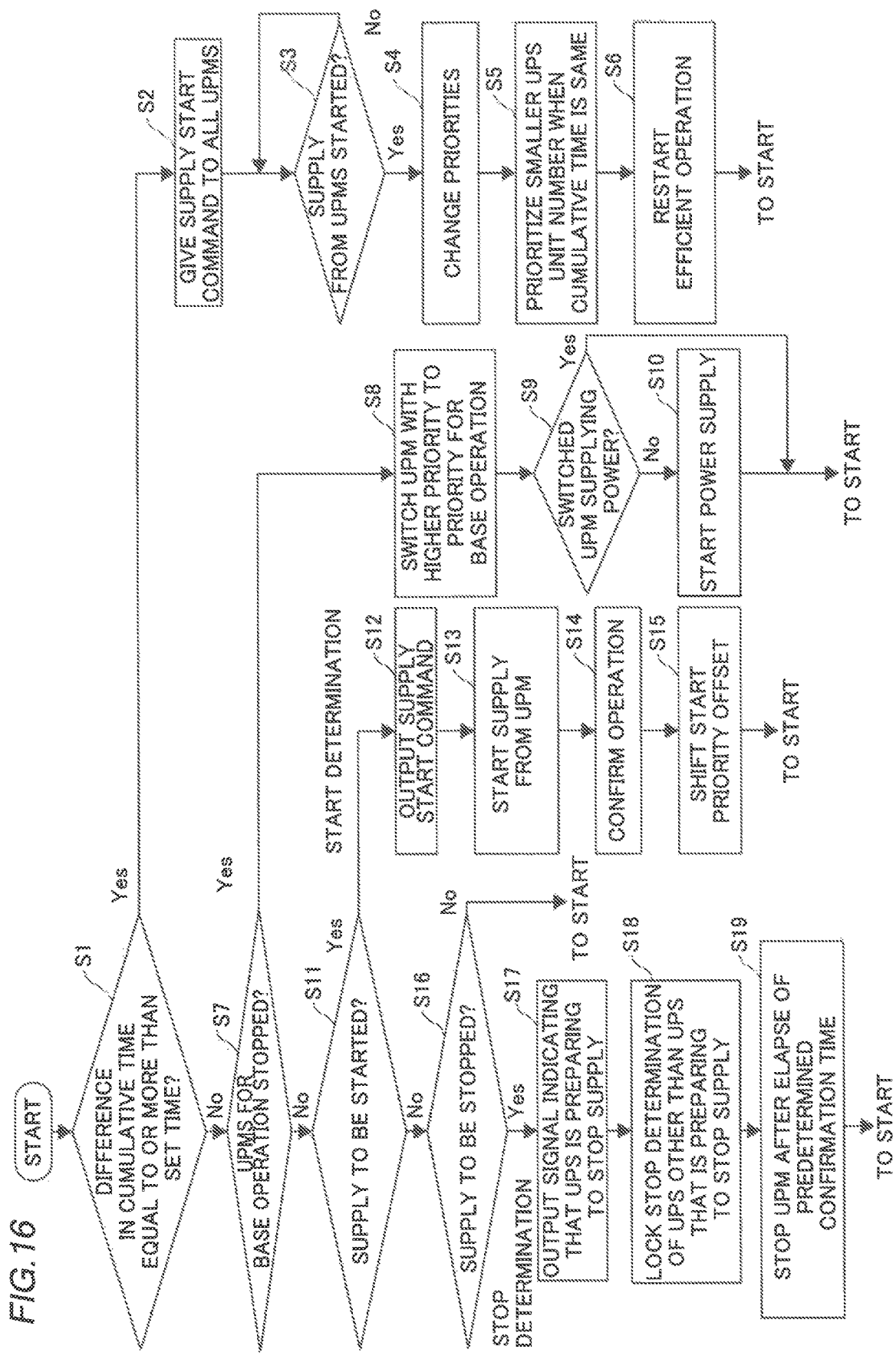
FIG. 16 is a flowchart showing the operation of the uninterruptible power supply system according to the first embodiment of the present invention.

The operation of the uninterruptible power supply system 1 is now described with reference to FIG. 16. This operation is performed by the controllers 22.

First, in step S1, the cumulative time of power supply of the power converters 11 that perform the base operation and the cumulative time of power supply of the power converters 11 that perform the efficient operation are calculated. When the difference between the cumulative time of power supply of the power converters 11 that perform the base operation and the cumulative time of power supply of the power converters 11 that perform the efficient operation is equal to or more than the set time (Yes), the process advances to step S2.

Then, in step S2, a command to start shared current supply is given to all the power converters 11 (UPM). Then, in step S3, it is determined whether or not shared current supply from all the power converters 11 (UPM) has been started. When it is determined Yes, the process advances to step S4.

In step S4, the priorities are changed such that the set priorities become higher as the cumulative time of power supply is shorter. Then, the power converters 11 with changed priorities of 1 and 2 become power converters 11 for the base operation. When the cumulative time of power supply is the same, in step S5, the smaller the unit number of the power converter 11 determined in advance, the higher the priority.

Then, in step S6, the efficient operation is restarted based on the changed priorities. Then, the process returns to START (step S1).

If No in step S1, the process advances to step S7. In step S7, it is determined whether or not the power converters 11 for the base operation have stopped. When it is determined Yes, the process advances to step S8.

In step S8, the power converter 11 with a higher priority among the power converters 11 for the efficient operation is switched to the priority for the base operation. Then, the process advances to step S9.

In step S9, it is determined whether or not the power converter 11 switched to the priority for the base operation is supplying the shared current (whether or not it is supplying power). When it is determined Yes, the process returns to START (step S1). When it is determined No, the process advances to step S10, and shared current supply (power supply) is started for the base operation.

When it is determined No in step S7, the process advances to step S11, and it is determined whether or not shared current supply is to be started based on the shared current command. When it is determined in step S11 that shared current supply is to be started (Yes), the process advances to step S12, and a command to start shared current supply is given to the uninterruptible power supply 10 (power converter 11) with a priority determined to start the supply via the signal line 37. Then, in step S13, shared current supply from the power converter 11 is started.

Then, in step S14, the operational status (base operation or efficient operation) of each power converter 11 is confirmed. In step S15, the start priority offset is shifted based on the number of power converters 11 confirmed to perform the efficient operation in step S14. That is, the priorities of the power converters 11 that perform the efficient operation are raised and shifted (changed) to the start priority offsets corresponding to the raised priorities. Then, the process returns to START.

When it is not determined in step S11 that shared current supply is to be started (No), the process advances to step S16, and it is determined whether or not shared current supply is to be stopped based on the shared current command. If No, the process returns to START. If Yes, the process advances to step S17, a command to stop shared current supply is output to the uninterruptible power supply 10 (power converter 11) with a priority determined to stop the supply via the signal line 37, and the uninterruptible power supply 10 (power converter 11) that stops the supply outputs a signal indicating that it is preparing to stop the supply to the other uninterruptible power supplies 10 (power converters 11). Thus, in step S18, the uninterruptible power supplies 10 other than the uninterruptible power supply 10 that is preparing to stop the supply temporarily stop (lock) control of determining whether or not to stop shared current supply. That is, the priorities are assigned to the power converters 11, and thus the plurality of power converters 11 does not stop shared current supply at the same time, but just in case, while one power converter 11 stops the supply, the other power converters 11 temporarily stop (lock) control of determining whether or not shared current supply not to stop the supply is stopped.

Then, in step S19, after the elapse of a predetermined confirmation time, shared current supply from the uninterruptible power supply 10 (power converter 11) that has been preparing to stop the supply is stopped. Then, the process returns to START.

(Advantageous Effects of First Embodiment)

According to the first embodiment, the following advantageous effects are achieved.

According to the first embodiment, as described above, the CTs 18 of the uninterruptible power supplies 10 detect the current that flows through the wiring 17 that connects the plurality of uninterruptible power supplies 10 in parallel to each other. Accordingly, the average current (the average value of the current) obtained by dividing the current to be supplied to the load 300 by the number of uninterruptible power supplies 10 that supply the shared current flows through the wiring 17, and thus the average value of the current for determining the shared current can be detected without sampling results (current values) detected by the CTs 18 provided in the other uninterruptible power supplies 10. Thus, each of the current-voltage conversion circuits 21 can quickly generate the shared current command based on the average value of the current quickly detected by the CTs 18. Consequently, each of the controllers 22 can quickly control the start or stop of shared current supply from the power converter 11 of its uninterruptible power supply 10 to the load 300 based on the quickly generated shared current command. Thus, the uninterruptible power supplies 10 can quickly switch between a state in which shared current supply to the load 300 has been stopped and a state in which shared current is being supplied to the load 300.

According to the first embodiment, as described above, each of the controllers 22 performs control of comparing the shared current level according to the magnitude of the shared current command with the start current set value common to the plurality of uninterruptible power supplies 10, integrating the time in which the shared current level becomes equal to or higher than the start current set value, and starting shared current supply from the power converter 11 when the integrated value becomes equal to or higher than the start determination threshold provided for each power converter 11 to determine whether or not shared current supply is started from the power converter 11. Accordingly, each of the controllers 22 starts shared current supply from the power converter 11 based on the shared current level according to the magnitude of the shared current command detected by its CT 18 without sampling results (current values) detected by the CTs 18 provided in the other uninterruptible power supplies 10 and determining an appropriate number of necessary uninterruptible power supplies 10, and thus shared current supply from the power converter 11 can be quickly started. When the start of shared current supply from the power converter 11 is delayed, current is excessively supplied from the other uninterruptible power supplies 10 in order to compensate for the shortage of power to be supplied to the load 300. On the other hand, in the uninterruptible power supply system 1 according to the first embodiment, shared current supply from the power converter 11 can be quickly started, and thus excessive current supply from the other uninterruptible power supplies 10 can be significantly reduced or prevented.

According to the first embodiment, as described above, each of the controllers 22 performs control of comparing the shared current level according to the magnitude of the shared current command with the start current set value common to the plurality of uninterruptible power supplies 10 and subtracting the time in which the shared current level becomes lower than the start current set value from the integrated value when the shared current level becomes lower than the start current set value after the shared current level becomes equal to or higher than the start current set value.

According to the first embodiment, as described above, the start determination threshold decreases as the shared current level increases. Thus, when the load current (shared current level) sharply increases, the start determination threshold sharply decreases, and thus the integrated value quickly becomes equal to or higher than the start determination threshold. Thus, when the load current (shared current level) sharply increases, shared current supply from the power converter 11 can be started more quickly.

According to the first embodiment, as described above, the start current set value increases as the number of power converters 11 that supply the shared current to the load 300 increases. Accordingly, when the number of power converters 11 that supply the shared current to the load 300 increases, the shared current level is unlikely to become equal to or higher than the start current set value. That is, when the number of power converters 11 that supply the shared current to the load 300 increases, a frequent increase in the number of power converters 11 that supply the shared current to the load 300 can be significantly reduced or prevented.

According to the first embodiment, as described above, the priorities are set on the plurality of power converters 11, and the smaller start determination thresholds are assigned as the set priorities are higher. Accordingly, as the set priorities are higher, shared current supply is more quickly started, and thus a state in which current is excessively supplied from the other uninterruptible power supplies 10 in order to compensate for the shortage of power to be supplied to the load 300 can be further significantly reduced or prevented.

According to the first embodiment, as described above, when the integrated value becomes equal to or higher than the start determination threshold and shared current supply from any of the plurality of power converters 11 that performs the efficient operation is started, the priorities of the remaining power converters 11 are raised, and the start determination thresholds corresponding to the raised priorities are assigned. Accordingly, even when the relatively small start determination thresholds corresponding to the raised priorities are assigned after shared current supply from any of the plurality of power converters 11 is started, and thereafter the shared current command increases, shared current supply can be quickly started from the power converters 11, the priorities of which have been raised.

According to the first embodiment, as described above, each of the controllers 22 performs control of comparing the shared current level according to the magnitude of the shared current command with the stop current set value common to the plurality of uninterruptible power supplies 10, integrating the time in which the shared current level becomes equal to or lower than the stop current set value, and stopping shared current supply from the power converter 11 when the integrated value becomes equal to or higher than the stop determination threshold provided for each power converter 11 to determine whether or not shared current supply is stopped from the power converter 11. Accordingly, each of the controllers 22 stops shared current supply from the power converter 11 based on the shared current level according to the magnitude of the shared current command detected by its CT 18 without sampling results (current values) detected by the CTs 18 provided in the other uninterruptible power supplies 10 and determining an appropriate number of necessary uninterruptible power supplies 10, and thus shared current supply from the power converter 11 can be quickly stopped. When the stop of shared current supply from the power converter 11 is delayed, the shared current supplied from one uninterruptible power supply 10 (power converter 11) to the load 300 becomes relatively small. The efficiency of the power converter 11 is better as the shared current from the power converter 11 is larger. In other words, a decrease in the efficiency of the power converter 11 due to the fact that the shared current supplied from one power converter 11 to the load 300 becomes relatively small can be significantly reduced or prevented.

According to the first embodiment, as described above, the stop determination threshold is varied so as to decrease as the shared current level decreases. Accordingly, when the load current (shared current level) sharply decreases, the stop determination threshold sharply decreases, and thus the integrated value quickly becomes equal to or higher than the stop determination threshold. Thus, when the load current (shared current level) sharply decreases, shared current supply from the power converter 11 can be stopped more quickly.

According to the first embodiment, as described above, the stop current set value decreases as the number of power converters 11 that supply the shared current to the load 300 decreases. Accordingly, when the number of power converters 11 that supply the shared current to the load 300 decreases, the shared current level is unlikely to become equal to or lower than the stop current set value. That is, when the number of power converters 11 that supply the shared current to the load 300 decreases, a frequent decrease in the number of power converters 11 that supply the shared current to the load 300 can be significantly reduced or prevented.

According to the first embodiment, as described above, the priorities are set on the plurality of power converters 11, and the larger stop determination thresholds are assigned as the set priorities are higher. Accordingly, it becomes difficult to stop shared current supply from the power converter 11 with a higher priority. Consequently, even when the load power increases again after shared current supply from the power converters 11 is stopped due to an instantaneous decrease in the load power, for example, shared current supply from the power converter 11 with a higher priority is not stopped, and thus the shortage of power to be supplied to the load 300 can be significantly reduced or prevented.

According to the first embodiment, as described above, when shared current supply from any of the plurality of power converters 11 is stopped, each of the controllers 22 of the uninterruptible power supplies 10 including the remaining power converters 11 temporarily stops control of determining whether or not shared current supply is stopped from the power converter 11 of its uninterruptible power supply 10, and restarts control of determining whether or not shared current supply is stopped from the power converter 11 of its uninterruptible power supply 10 after the operation of stopping shared current supply from any of the plurality of power converters 11 is completed. Accordingly, when shared current supply from any of the plurality of power converters 11 is stopped, each of the controllers 22 of the uninterruptible power supplies 10 including the remaining power converters 11 temporarily stops control of determining whether or not shared current supply is stopped from the power converter 11 of its uninterruptible power supply 10, and thus the stop of shared current supply from the plurality of power converters 11 in a relatively short time can be significantly reduced or prevented.

According to the first embodiment, as described above, the priorities are set on the plurality of power converters 11, the cumulative time of power supply of the power converters 11 that perform the base operation and the cumulative time of power supply of the power converters 11 that perform the efficient operation are calculated, and when the difference between the cumulative times of power supply is equal to or more than the predetermined set time, the power converter 11 with a shorter cumulative time of power supply is reassigned to a power converter 11 that performs the base operation, and the power converter 11 with a longer cumulative time of power supply is reassigned to a power converter 11 that performs the efficient operation. Furthermore, the priorities are changed such that the set priorities become higher as the cumulative time of power supply is shorter. Accordingly, the priorities are changed such that the set priorities become higher as the cumulative time of power supply is shorter, and thus the cumulative time of power supply can be averaged. Consequently, a failure and a decrease in the service life due to a heavy burden on some of the power converters 11 can be significantly reduced or prevented.

According to the first embodiment, as described above, when the power converter 11 fails, the power converter 11 with a higher priority among the plurality of power converters 11 is switched to a power converter 11 that performs the base operation. Accordingly, even when the power converter 11 fails, the power converters 11 that constantly supply the shared current to the load 300 can be ensured, and thus power can be stably supplied to the load 300.

According to the first embodiment, as described above, the power converters 11 that have stopped shared current supply to the load 300 among the plurality of power converters 11 wait while the phases of the internal inverter command waveforms of the power converters 11 that have stopped shared current supply to the load 300 are synchronized with the phase of power supplied by the power converters 11 that have started shared current supply to the load 300. Accordingly, the phases are synchronized in advance, and thus shared current supply to the load 300 can be quickly started from the power converters 11 that have stopped shared current supply to the load 300.

Second Embodiment

An uninterruptible power supply system 100 according to a second embodiment is now described with reference to FIGS. 17 to 22. The uninterruptible power supply system 100 includes two power converters 111 (power converters 111a and 111b) in each of uninterruptible power supplies 110 unlike the aforementioned first embodiment in which one power converter 11 is provided in each of the uninterruptible power supplies 10.

Figure 17:
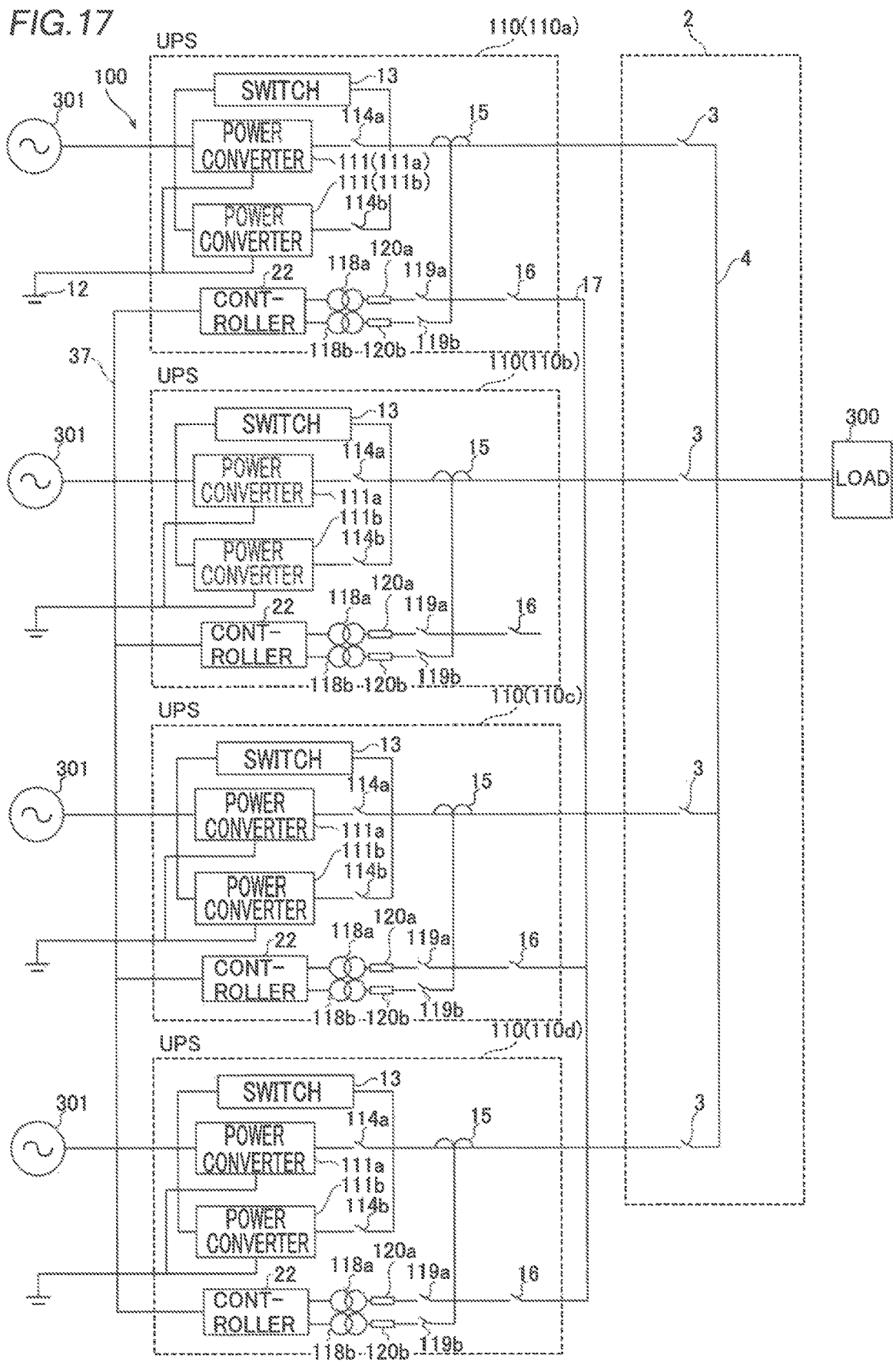
FIG. 17 is a block diagram of an uninterruptible power supply system according to a second embodiment of the present invention.

As shown in FIG. 17, the uninterruptible power supply system 100 includes a plurality of uninterruptible power supplies 110 connected in parallel to each other to a load 300. The uninterruptible power supplies 110 each include the two power converters 111a and 111b connected in parallel to each other. A switch 114a and a switch 114b are provided on the output sides of the power converters 111a and 111b, respectively. In addition, two switches 119a and 119b, two resistors 120a and 120b, and two CTs 118a and 118b are provided so as to correspond to the two power converters 111a and 111b. When the switch 114a and the switch 119a are turned on, a shared current command of the power converter 111a is obtained. Similarly, when the switch 114b and the switch 119b are turned on, a shared current command of the power converter 111b is obtained. That is, in one uninterruptible power supply 110, the start and stop of shared current supply from the two power converters 111a and 111b can be individually controlled. The CTs 118a and 118b are examples of a "current detector" in the claims.

Figure 18:
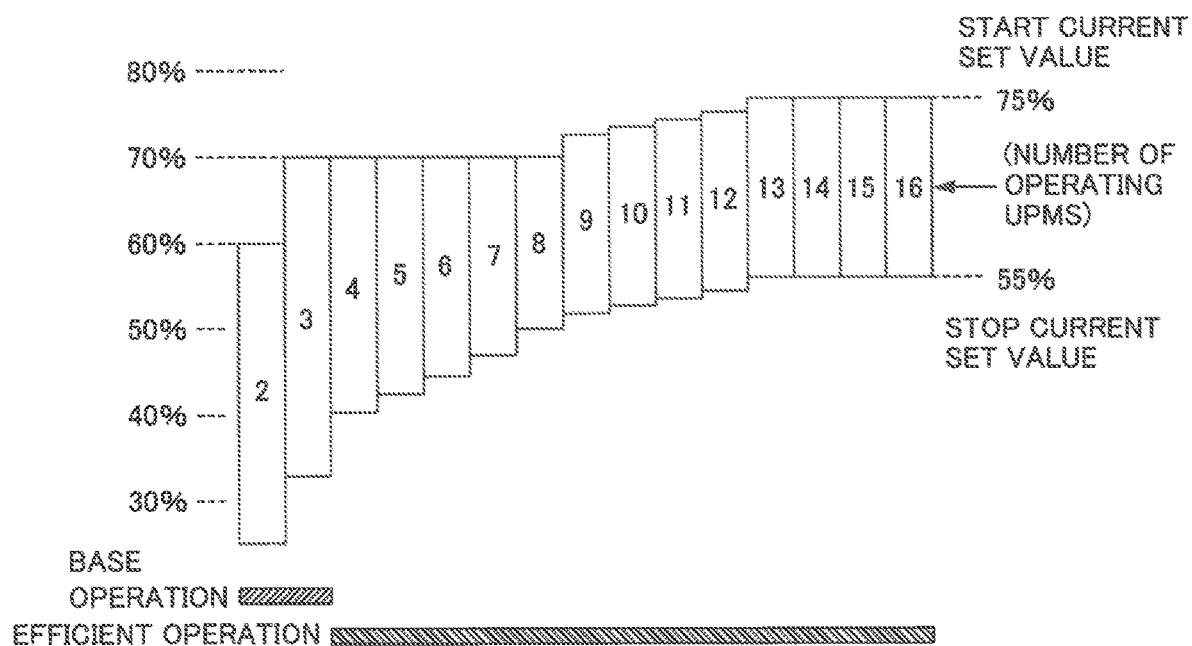
FIG. 18 is a diagram illustrating a start current set value and a stop current set value according to the second embodiment of the present invention.

As shown in FIG. 18, when the uninterruptible power supply system 100 includes a total of sixteen power converters 111 (eight uninterruptible power supplies 110×two power converters 111), the three power converters 111 constantly supply the shared current to the load 300 (base operation), for example. The remaining thirteen power converters 111 start or stop the supply according to the magnitude of the shared current to the load 300 (efficient operation). When the two power converters 111 supply the shared current, a start current set value is set to 60%. When the number of power converters 11 that supply the shared current is three or more and eight or less, the start current set value is set to 70%. When the number of power converters 11 that supply the shared current is nine or more and twelve or less, the start current set value increases each time the number of power converters 11 that supply the shared current increases. When the number of power converters 11 that supply the shared current is thirteen or more and sixteen or less, the start current set value is set to 75%.

As shown in FIG. 18, a stop current set value is varied so as to decrease as the number of power converters 111 that supply the shared current to the load 300 decreases. For example, when the two power converters 111 supply the shared current, the stop current set value is set to less than 30%. Each time the number of power converters 111 that supply the shared current increases one by one, the stop current set value increases. When the number of power converters 111 that supply the shared current is thirteen or more and sixteen or less, the start current set value is set to 55% (constant).

Figure 19:
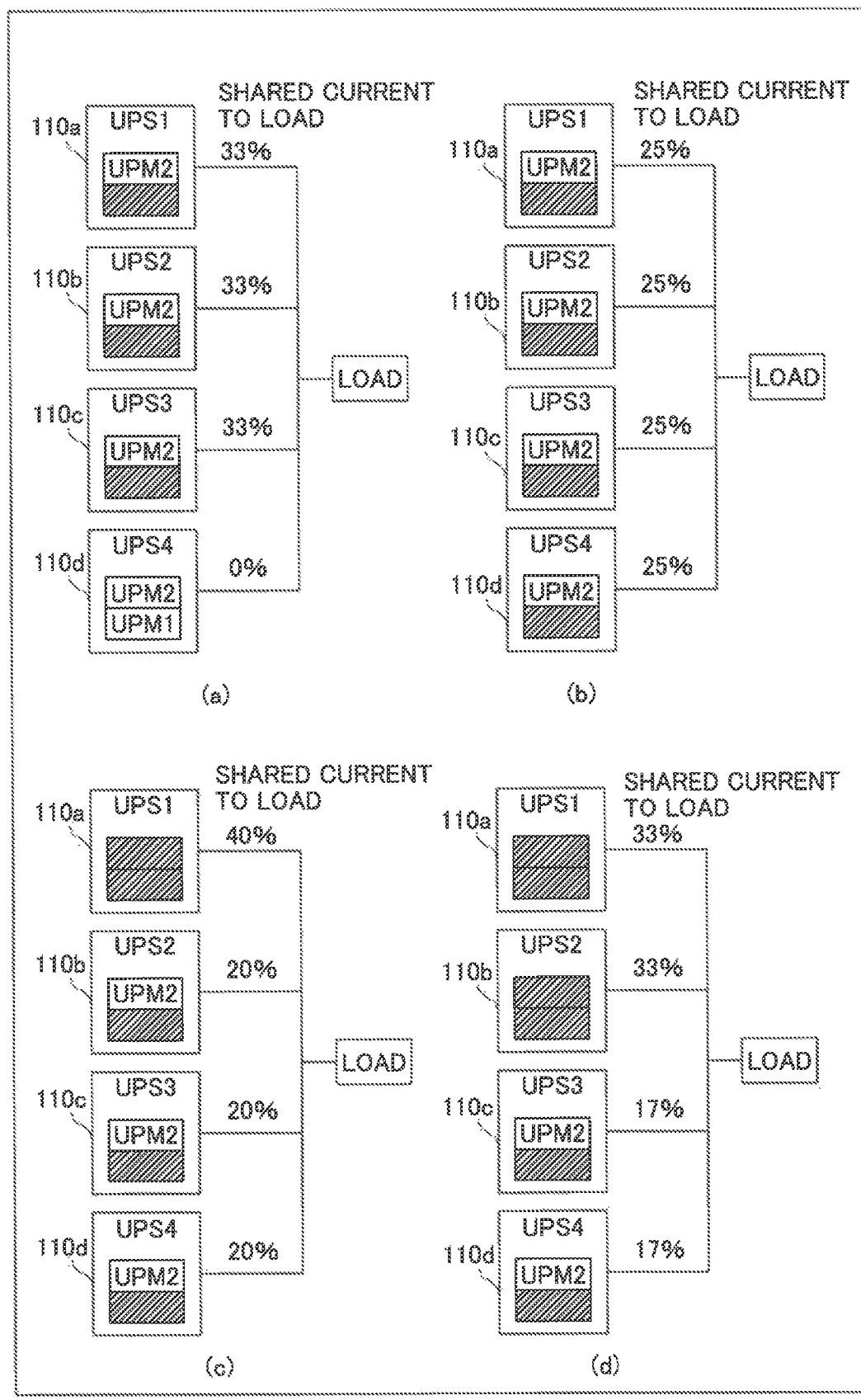
FIG. 19 is a diagram illustrating the load shared current of the uninterruptible power supply system according to the second embodiment of the present invention.

An operation in the case in which four uninterruptible power supplies (UPS) 110 each include two power converters (UPM) 111 (four parallel operation pattern) is now described with reference to FIG. 19.

Figure 20:
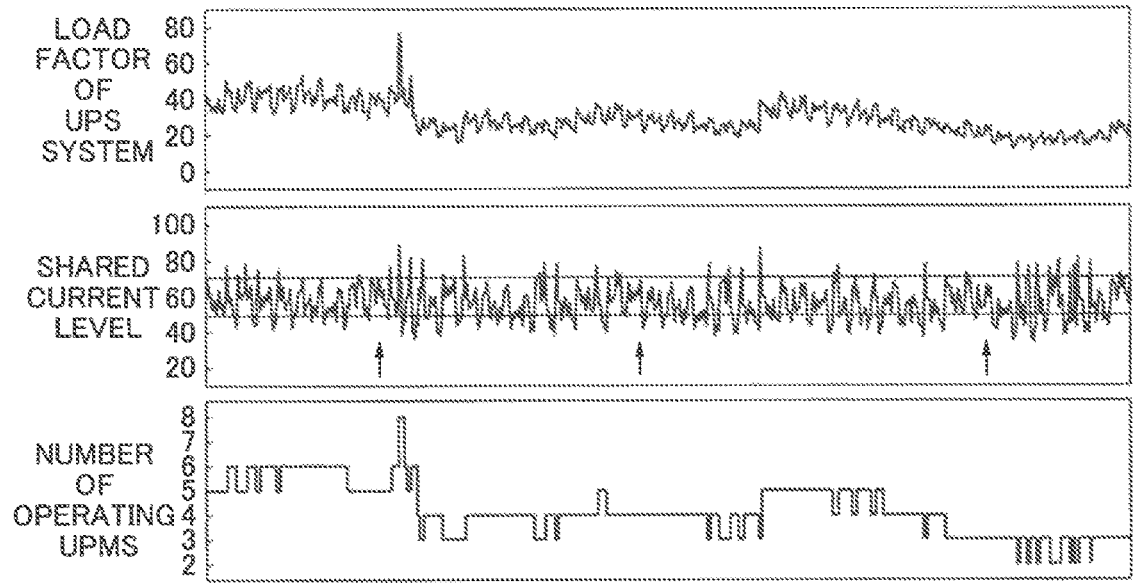
FIG. 20 is a diagram showing the operational status of the UPMs when the stop current set value (50%) is fixed.

FIG. 19(a) shows an example in which 33% of the shared current is supplied from one power converter 111 of each of the three uninterruptible power supplies 110 to the load 300. FIG. 19(b) shows an example in which 25% of the shared current is supplied from one power converter 111 of each of the four uninterruptible power supplies 110 to the load 300. In FIG. 19(c), 20% of the share current is supplied from one power converter 111a of each of the uninterruptible power supplies 110b to 110d of the four uninterruptible power supplies 110a to 110d to the load 300. On the other hand, 20% (40% in total) of the shared current is supplied from each of the two power converters 111a and 111b of the uninterruptible power supply 110a to the load 300. In FIG. 19(d), 17% of the shared current is supplied from one power converter 111 of each of the uninterruptible power supplies 110c and 110d of the four uninterruptible power supplies 110a to 110d to the load 300. On the other hand, 17% (33% in total) of the shared current is supplied from each of the two power converters 111 of each of the uninterruptible power supplies 110a and 110b to the load 300. As shown in FIGS. 19(c) and 19(d), even when the amount (%) of shared current supplied from one uninterruptible power supply 110 is different, the amount (%) of shared current supplied from one power converter 111 is controlled to be the same.

Figure 21:
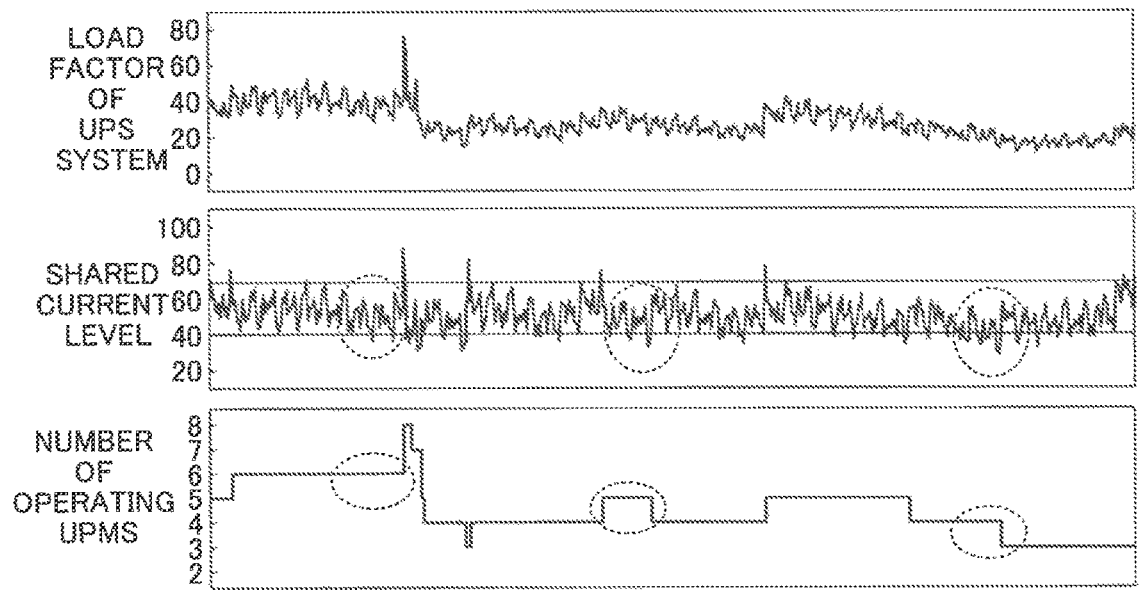
FIG. 21 is a diagram showing the operational status of the UPMs when the stop current set value (40%) is fixed.
Figure 22:
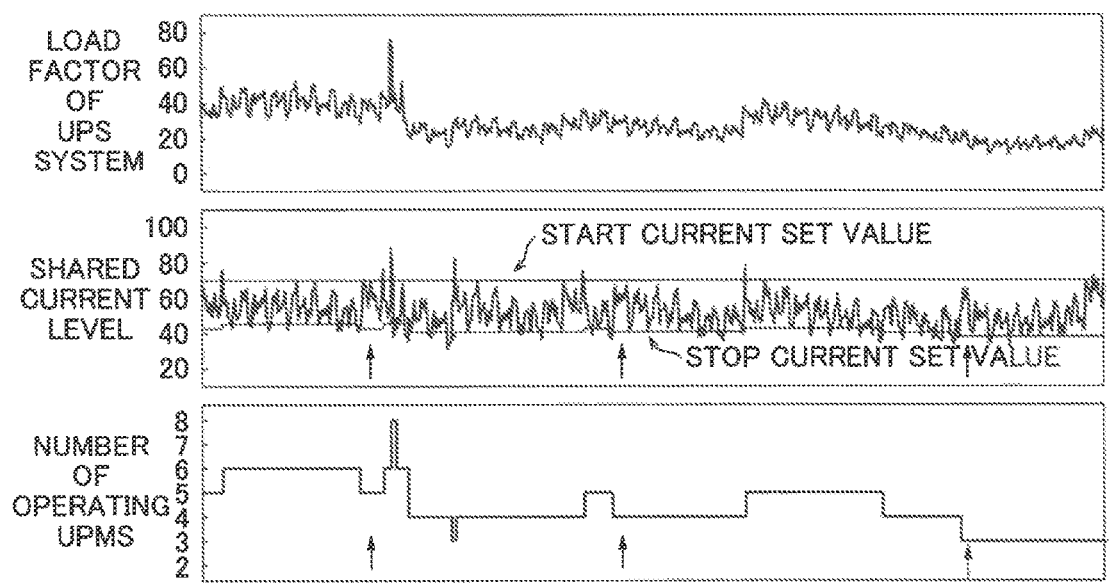
FIG. 22 is a diagram showing the operational status of the UPMs when the stop current set value is variable.

An operation simulation performed based on the structure of the uninterruptible power supply system 100 according to the second embodiment is now described with reference to FIGS. 20 to 22.

First, the simulation conditions are described. In the uninterruptible power supply system 100, four uninterruptible power supplies 110 are connected in parallel to each other to the load 300. In each of the four uninterruptible power supplies 110, two power converters 111 are provided. The load pulsation (width) of the uninterruptible power supply system 100 is 20% of the load factor. The load factor suddenly changes by 35% at maximum. The load factor varies between 15% and 75%. The load variation rate (width) is 15% to 50% when a sudden change in the load factor is excluded.

First, the case in which the start current set value is fixed to 70% and the stop current set value is fixed to 50% is described with reference to FIG. 20. In this case, as shown in a lowermost view of FIG. 20, it has been found that the number of operating power converters 111 (UPM) frequently increases or decreases as the load factor varies.

Next, the case in which the start current set value is fixed to 70% and the stop current set value is fixed to 40% is described with reference to FIG. 21. In this case, as shown in a lowermost view of FIG. 21, it has been found that an increase or decrease in the number of operating UPMs cannot be seen so much, as in the case of FIG. 20 whereas as in regions surrounded by dotted lines in FIG. 21, the efficient operation is not performed in regions in which the efficient operation is supposed to be performed. Specifically, in the regions surrounded by the dotted lines in FIG. 21, the number of operating UPMs has not decreased despite the fact that the load factor (shared current level) is relatively small.

Next, the case in which the stop current set value is variable as in the second embodiment is described with reference to FIG. 22. Specifically, the start current set value is constant at 70% whereas the stop current set value is 50% when the number of operating UPMs is eight, the stop current set value is 44% when the number of operating UPMs is five, and the stop current set value is 40% when the number of operating UPMs is three. As shown in FIG. 22, when the stop current set value is variable, the number of operating UPMs decreases in regions corresponding to the regions surrounded by the dotted lines in FIG. 21 when the load factor (shared current level) is relatively small. That is, it has been confirmed that the efficient operation is appropriately performed by making the stop current set value variable.

Modified Examples

The embodiments disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

Figure 23:
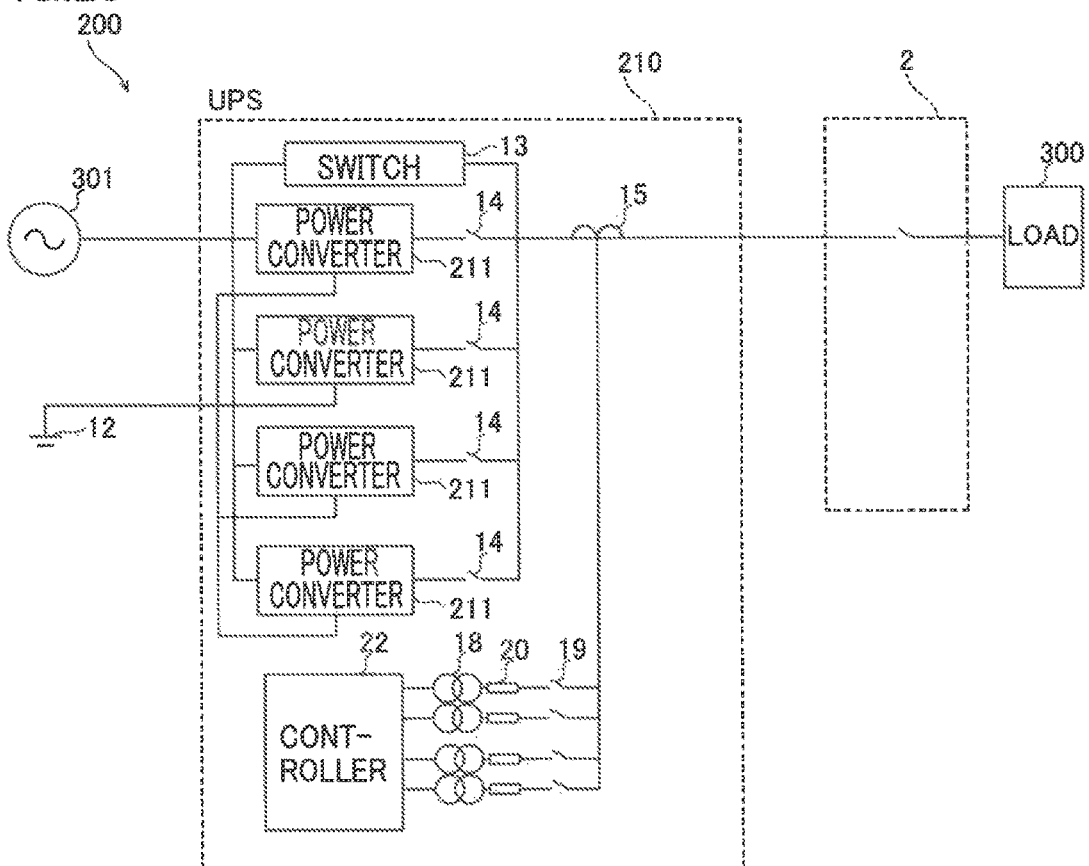
FIG. 23 is a block diagram of an uninterruptible power supply system according to a modified example of the first and second embodiments of the present invention.

For example, while the uninterruptible power supply system includes the plurality of uninterruptible power supplies connected in parallel to each other in each of the aforementioned first and second embodiments, the present invention is not restricted to this. For example, as an uninterruptible power supply system 200 according to a modified example shown in FIG. 23, one uninterruptible power supply 210 may alternatively be provided in the uninterruptible power supply system 200. In this case, a plurality of (three or more, for example) power converters 211 is provided inside one uninterruptible power supply 210. The same operation as that in the first and second embodiments is performed inside one uninterruptible power supply 210.

While the start determination threshold has an inverted characteristic (line-symmetrical characteristic) with respect to the shared current level, and the stop determination threshold has a similar characteristic (similar figure) to the shared current level in each of the aforementioned first and second embodiments, the present invention is not restricted to this. For example, the start determination threshold may not be line-symmetrical to the shared current level, or the stop determination threshold may not have a similar figure to the shared current level.

The manner of varying the start current set value shown in FIG. 9 (FIG. 18) and the manner of varying the stop current set value shown in FIG. 9 (FIG. 18) are mere examples, and the manner of varying the start current set value and the manner of varying the stop current set value may be different from those in FIG. 9 (FIG. 18).

While there are the two (three) power converters that perform the base operation in each of the aforementioned first and second embodiments, the present invention is not restricted to this. For example, the number of power converters that perform the base operation may alternatively be other than two (three).

While the four (or six or eight) uninterruptible power supplies are provided in parallel to each other in each of the aforementioned first and second embodiments, the present invention is not restricted to this. According to the present invention, the number of uninterruptible power supplies provided in parallel to each other may alternatively be other than four (or six or eight).

While the current transformer detects the current that flows through the wiring in each of the aforementioned first and second embodiments, the present invention is not restricted to this. According to the present invention, a current detector other than the current transformer may alternatively detect the current that flows through the wiring.

While the control process operations performed by the controller are described using a flowchart in a flow-driven manner in which processes are performed in order along a process flow for the convenience of illustration in each of the aforementioned first and second embodiments, the present invention is not restricted to this. According to the present invention, the control process operations performed by the controller may alternatively be performed in an event-driven manner in which the processes are performed on an event basis. In this case, the control process operations performed by the controller may be performed in a complete event-driven manner or in a combination of an event-driven manner and a flow-driven manner.

What is claimed is:
1. An uninterruptible power supply system, comprising:
a plurality of uninterruptible power supplies connected in parallel to each other to a load, wherein
each of the plurality of uninterruptible power supplies includes a power converter that supplies current to the load and a controller, and
the controller included in each of the plurality of uninterruptible power supplies controls start or stop of shared current supply from the power converter based on a shared current command in the power converter of its uninterruptible power supply, generated based on current shunted to the power converter of its uninterruptible power supply and the power converter of another uninterruptible power supply that are performing parallel operation.

2. The uninterruptible power supply system according to claim 1, wherein the controller performs control of comparing a shared current level according to a magnitude of the shared current command with a first start threshold common to the plurality of uninterruptible power supplies, integrating a time in which the shared current level becomes equal to or higher than the first start threshold, and starting the shared current supply from the power converter when an integrated value becomes equal to or higher than a second start threshold provided for each power converter to determine whether or not the shared current supply is started from the power converter.

3. The uninterruptible power supply system according to claim 2, wherein the controller performs control of comparing the shared current level according to the magnitude of the shared current command with the first start threshold common to the plurality of uninterruptible power supplies and subtracting a time in which the shared current level becomes lower than the first start threshold from the integrated value when the shared current level becomes lower than the first start threshold after the shared current level becomes equal to or higher than the first start threshold.

4. The uninterruptible power supply system according to claim 2, wherein the second start threshold decreases as the shared current level increases.

5. The uninterruptible power supply system according to claim 2, wherein the first start threshold increases as a number of power converters that supply shared current to the load increases.

6. The uninterruptible power supply system according to claim 2, wherein
the plurality of uninterruptible power supplies includes at least three uninterruptible power supplies,
power converters provided in the at least three uninterruptible power supplies are assigned to a first power converter that constantly supplies shared current to the load and a plurality of second power converters that starts or stops the shared current supply according to a magnitude of the shared current to the load, and
priorities are set on the plurality of power converters, and smaller second start thresholds are assigned as set priorities are higher.

7. The uninterruptible power supply system according to claim 6, wherein
the controller provided in each of the plurality of uninterruptible power supplies is connected by a signal line through which the power converters of the plurality of uninterruptible power supplies communicate their supply start states or supply stop states to each other, and
when the integrated value becomes equal to or higher than the second start threshold and the shared current supply from any of the plurality of second power converters is started, a priority of remaining second power converters is raised, and the second start threshold corresponding to a raised priority is assigned.

8. The uninterruptible power supply system according to claim 1, wherein the controller performs control of comparing the shared current level according to a magnitude of the shared current command with a first stop threshold common to the plurality of uninterruptible power supplies, integrating a time in which the shared current level becomes equal to or lower than the first stop threshold, and stopping the shared current supply from the power converter when an integrated value becomes equal to or higher than a second stop threshold provided for each power converter to determine whether or not the shared current supply is stopped from the power converter.

9. The uninterruptible power supply system according to claim 8, wherein the second stop threshold decreases as the shared current level decreases.

10. The uninterruptible power supply system according to claim 8, wherein the first stop threshold decreases as a number of power converters that supply shared current to the load decreases.

11. The uninterruptible power supply system according to claim 8, wherein
the plurality of uninterruptible power supplies includes at least three uninterruptible power supplies,
power converters provided in the at least three uninterruptible power supplies are assigned to a first power converter that constantly supplies shared current to the load and a plurality of second power converters that starts or stops the shared current supply according to a magnitude of the shared current to the load, and
priorities are set on the plurality of power converters, and larger second stop thresholds are assigned as set priorities are higher.

12. The uninterruptible power supply system according to claim 11, wherein when the shared current supply from any of the plurality of second power converters is stopped, the controller of an uninterruptible power supply including a remaining second power converter temporarily stops control of determining whether or not the shared current supply is stopped from a second power converter of its uninterruptible power supply, and restarts control of determining whether or not the shared current supply is stopped from the second power converter of its uninterruptible power supply after an operation of stopping the shared current supply from any of the plurality of second power converters is completed.

13. The uninterruptible power supply system according to claim 1, wherein
the plurality of uninterruptible power supplies includes at least three uninterruptible power supplies,
power converters provided in the at least three uninterruptible power supplies are assigned to a first power converter that constantly supplies shared current to the load and a plurality of second power converters that starts or stops the shared current supply according to a magnitude of the shared current to the load, and
a second power converter that has stopped the shared current supply to the load among the plurality of second power converters waits while a phase of an internal inverter command waveform is synchronized with a phase of a voltage waveform supplied by a second power converter that has started the shared current supply to the load in a stop state in which an inverter voltage is not generated.

14. An uninterruptible power supply comprising:
a power converter that shares and supplies current to a load; and
a controller that controls start or stop of shared current supply from the power converter based on a shared current command in its power converter, generated based on current shunted to its power converter and another power converter that are performing parallel operation.

15. The uninterruptible power supply according to claim 14, wherein the controller performs control of comparing a shared current level according to a magnitude of the shared current command with a first start threshold common to the power converter and the another power converter, integrating a time in which the shared current level becomes equal to or higher than the first start threshold, and starting the shared current supply from the power converter when an integrated value becomes equal to or higher than a second start threshold provided for each of the power converter and the another power converter to determine whether or not the shared current supply is started from the power converter.

16. The uninterruptible power supply according to claim 15, wherein the controller performs control of comparing the shared current level according to the magnitude of the shared current command with the first start threshold common to the power converter and the another power converter and subtracting a time in which the shared current level becomes lower than the first start threshold from the integrated value when the shared current level becomes lower than the first start threshold after the shared current level becomes equal to or higher than the first start threshold.

17. The uninterruptible power supply according to claim 15, wherein the second start threshold decreases as the shared current level increases.

18. The uninterruptible power supply according to claim 14, wherein the controller performs control of comparing the shared current level according to a magnitude of the shared current command with a first stop threshold common to the power converter and the another power converter, integrating a time in which the shared current level becomes equal to or lower than the first stop threshold, and stopping the shared current supply from the power converter when an integrated value becomes equal to or higher than a second stop threshold provided for each of the power converter and the another power converter to determine whether or not the shared current supply is stopped from the power converter.

19. The uninterruptible power supply according to claim 18, wherein the second stop threshold decreases as the shared current level decreases.

* * * * *